(12) United States Patent
Ogawa et al.

(10) Patent No.: US 11,983,910 B2
(45) Date of Patent: May 14, 2024

(54) IMAGE PROCESSING SYSTEM, IMAGE PROCESSING METHOD, AND STORAGE MEDIUM EACH FOR OBTAINING PIXELS OF OBJECT USING NEURAL NETWORK

(71) Applicant: CANON KABUSHIKI KAISHA, Tokyo (JP)

(72) Inventors: Takuya Ogawa, Kanagawa (JP); Motoki Ikeda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 359 days.

(21) Appl. No.: 17/317,673

(22) Filed: May 11, 2021

(65) Prior Publication Data
US 2021/0357674 A1    Nov. 18, 2021

(30) Foreign Application Priority Data
May 14, 2020    (JP) .................................. 2020-085350

(51) Int. Cl.
*G06V 10/22* (2022.01)
*G06F 18/213* (2023.01)
(Continued)

(52) U.S. Cl.
CPC ............ *G06V 10/22* (2022.01); *G06F 18/213* (2023.01); *G06N 3/04* (2013.01); *G06V 10/82* (2022.01);
(Continued)

(58) Field of Classification Search
CPC ........ G06V 10/22; G06V 10/82; G06V 20/62; G06V 30/153; G06V 30/412;
(Continued)

(56) References Cited

U.S. PATENT DOCUMENTS

2003/0012374 A1* 1/2003 Wu ..................... H04L 9/3247
        713/176
2013/0272393 A1* 10/2013 Kirenko ................ H04N 19/17
        375/240.08

(Continued)

FOREIGN PATENT DOCUMENTS

| CN | 108537146 A | 9/2018 |
| JP | 2019177032 A | 10/2019 |
| JP | 2019194821 A | 11/2019 |

OTHER PUBLICATIONS

Andreas Kölsch, et al., Recognizing Challenging Handwritten Annotations with Fully Convolutional Networks, 2018 16th International Conference on Frontiers in Handwriting Recognition (ICFHR), 7 pages, Internet, https://arxiv.org/pdf/1804.00236v2.pdf.

(Continued)

*Primary Examiner* — Dhaval V Patel
(74) *Attorney, Agent, or Firm* — Canon U.S.A., Inc. IP Division

(57) ABSTRACT

A first decoder obtains a region including an object targeted for recognition based on a feature map obtained by performing convolutional processing on a processing target image. Next, the first decoder obtains, from the feature map, a partial feature map of a portion corresponding to the obtained region including the object targeted for recognition. Then, a second decoder obtains pixels corresponding to the object targeted for recognition based on the partial feature map. This reduces the amount of calculation required for decoder units included in a neural network.

6 Claims, 28 Drawing Sheets

(51) Int. Cl.
  *G06N 3/04* (2023.01)
  *G06V 10/82* (2022.01)
  *G06V 20/62* (2022.01)
  *G06V 30/148* (2022.01)
  *G06V 30/412* (2022.01)
(52) U.S. Cl.
  CPC ............ *G06V 20/62* (2022.01); *G06V 30/153* (2022.01); *G06V 30/412* (2022.01)
(58) Field of Classification Search
  CPC ......... G06F 18/213; G06F 18/24; G06N 3/04; G06N 3/045; G06N 3/084
  See application file for complete search history.

(56) References Cited

U.S. PATENT DOCUMENTS

| | | | |
|---|---|---|---|
| 2015/0055875 A1* | 2/2015 | Kawaguchi .......... | G06V 10/457 382/199 |
| 2016/0100198 A1* | 4/2016 | Matsui ................. | H04N 19/597 382/236 |
| 2016/0232440 A1* | 8/2016 | Gregor ..................... | G06N 3/04 |
| 2020/0320288 A1* | 10/2020 | Kunnumma ........... | G06V 40/33 |

OTHER PUBLICATIONS

Guillaume Renton, et al., Handwritten Text Line Segmentation Using Fully Convolutional Network, 2017 14th IAPR International Conference on Document Analysis and Recognition (ICDAR), 5 pages, Internet, https://teklia.com/publications/3586f005.pdf.

\* cited by examiner

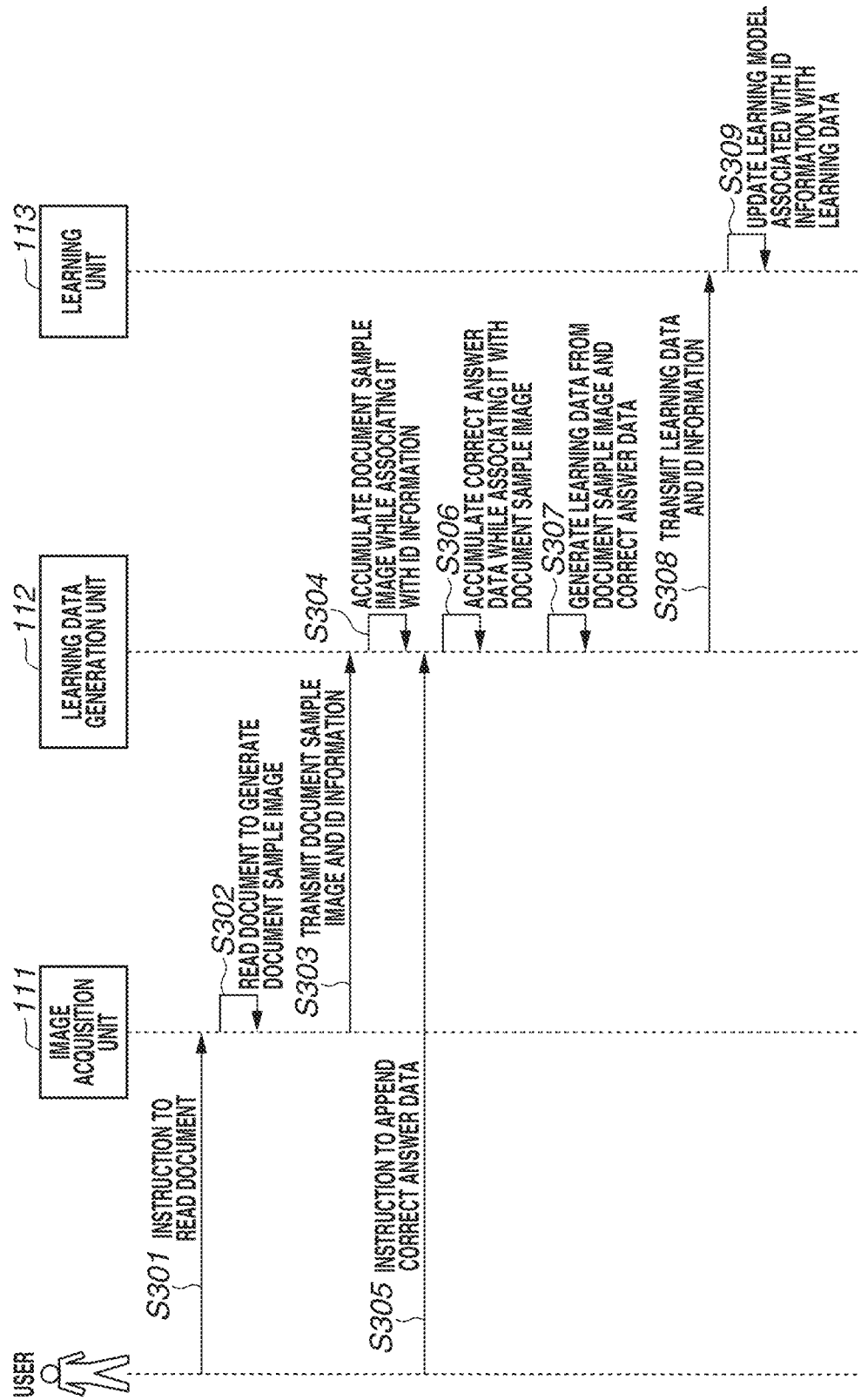

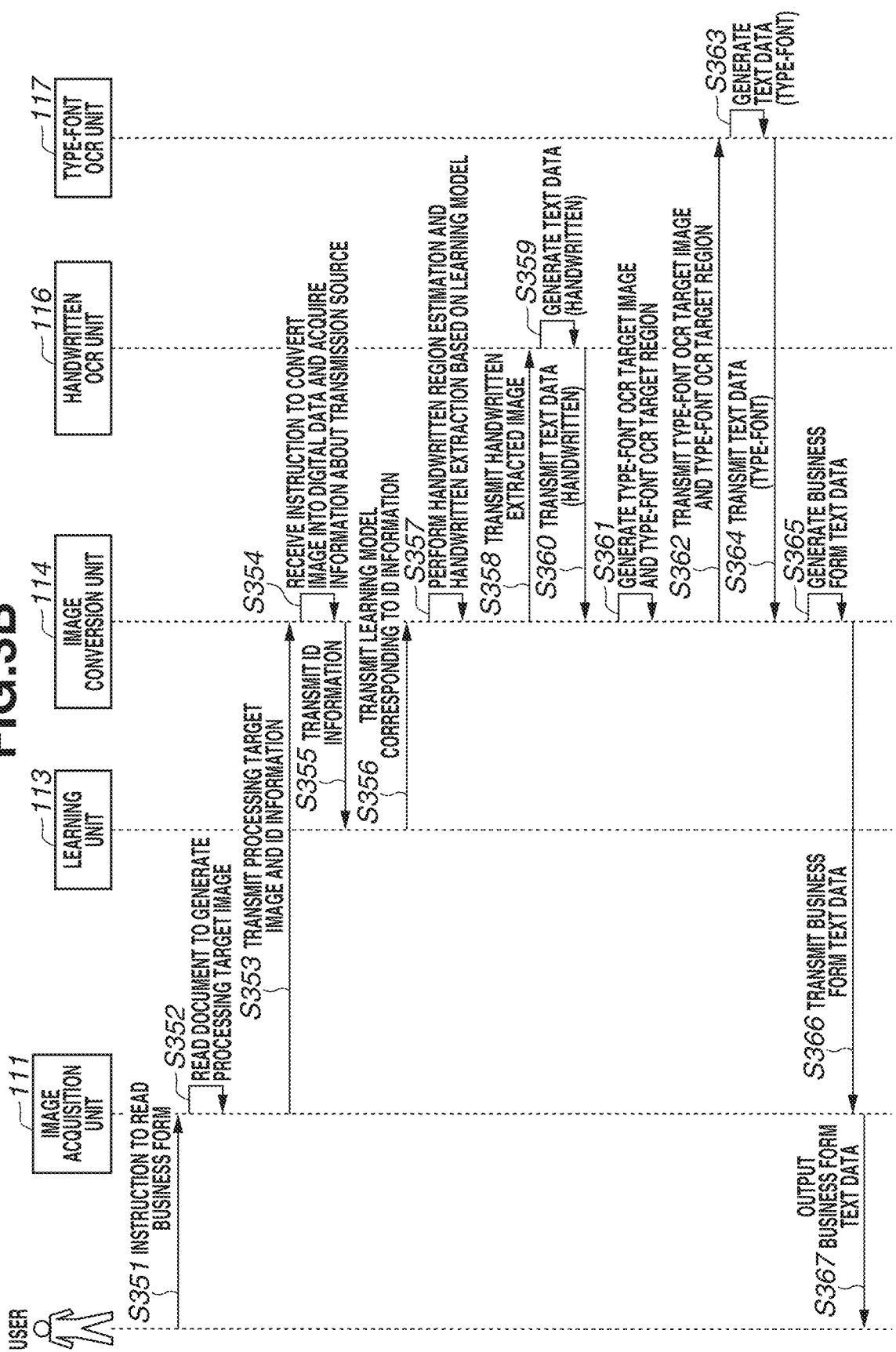

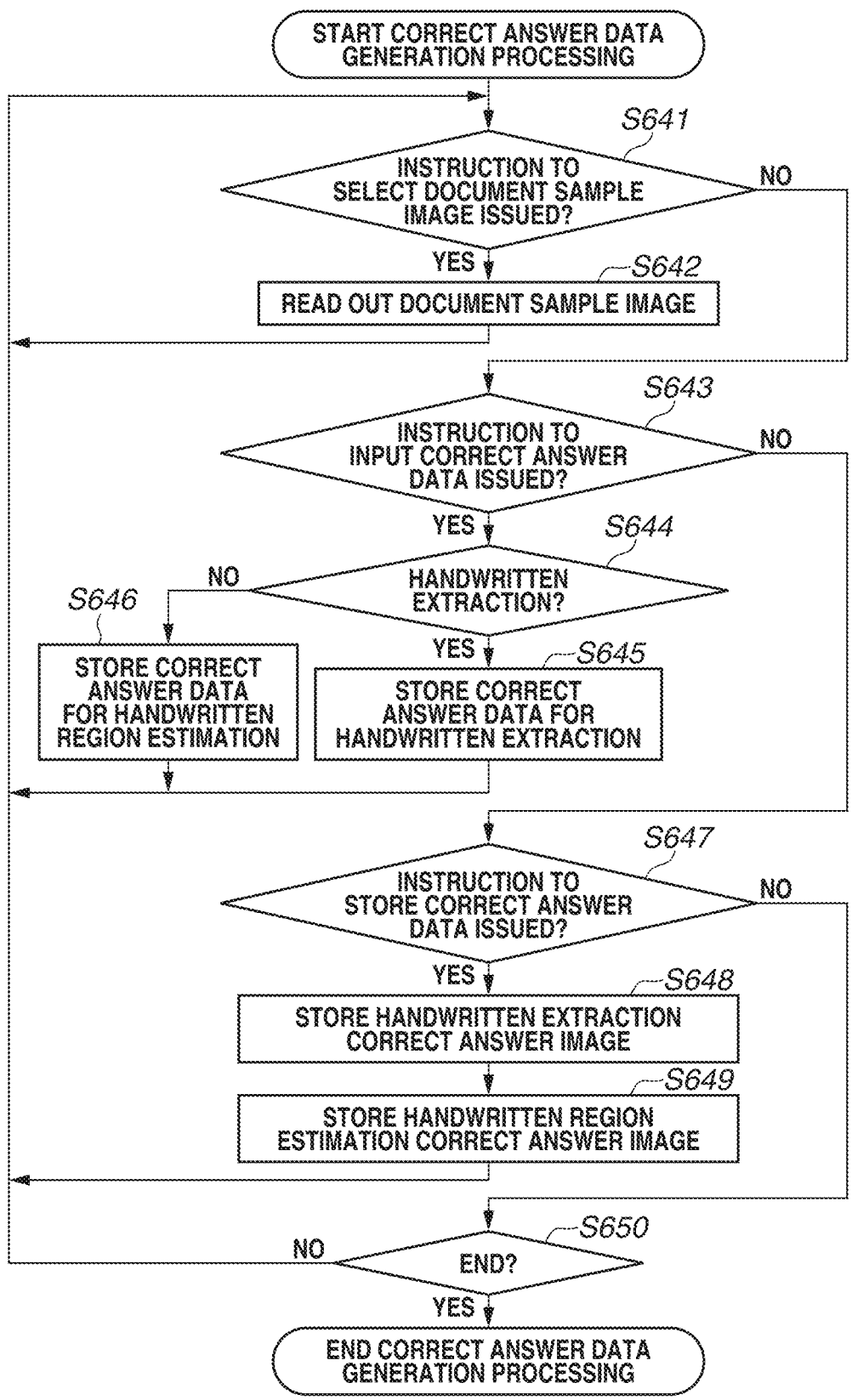

FIG.8A
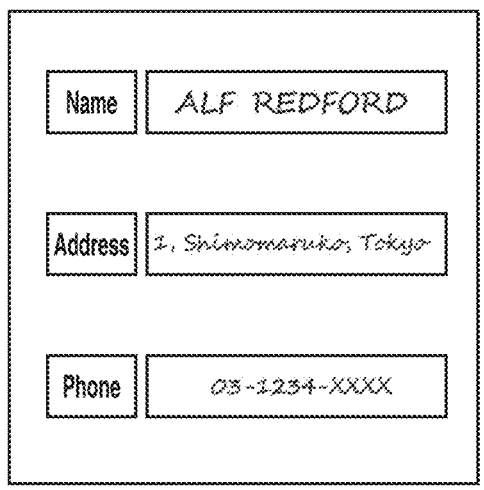
INPUT IMAGE
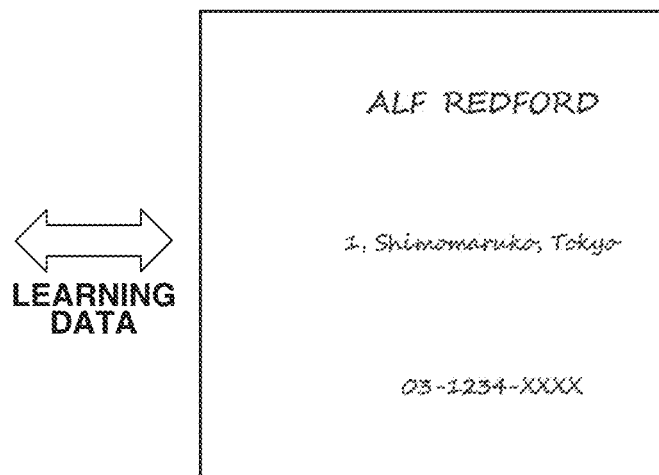
LEARNING DATA
CORRECT ANSWER LABEL IMAGE
FIG.8B
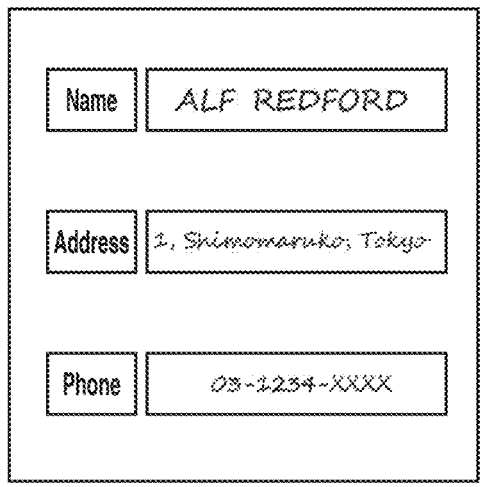
INPUT IMAGE
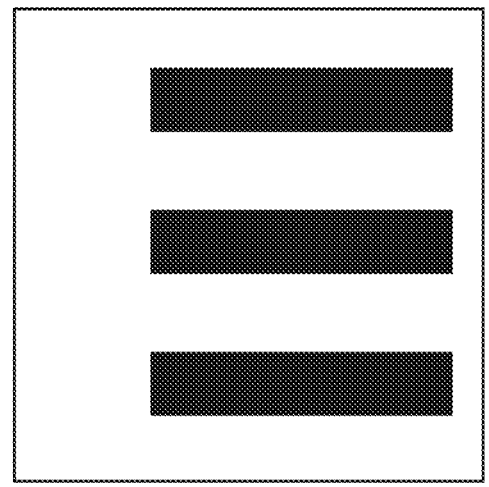
LEARNING DATA
CORRECT ANSWER LABEL IMAGE

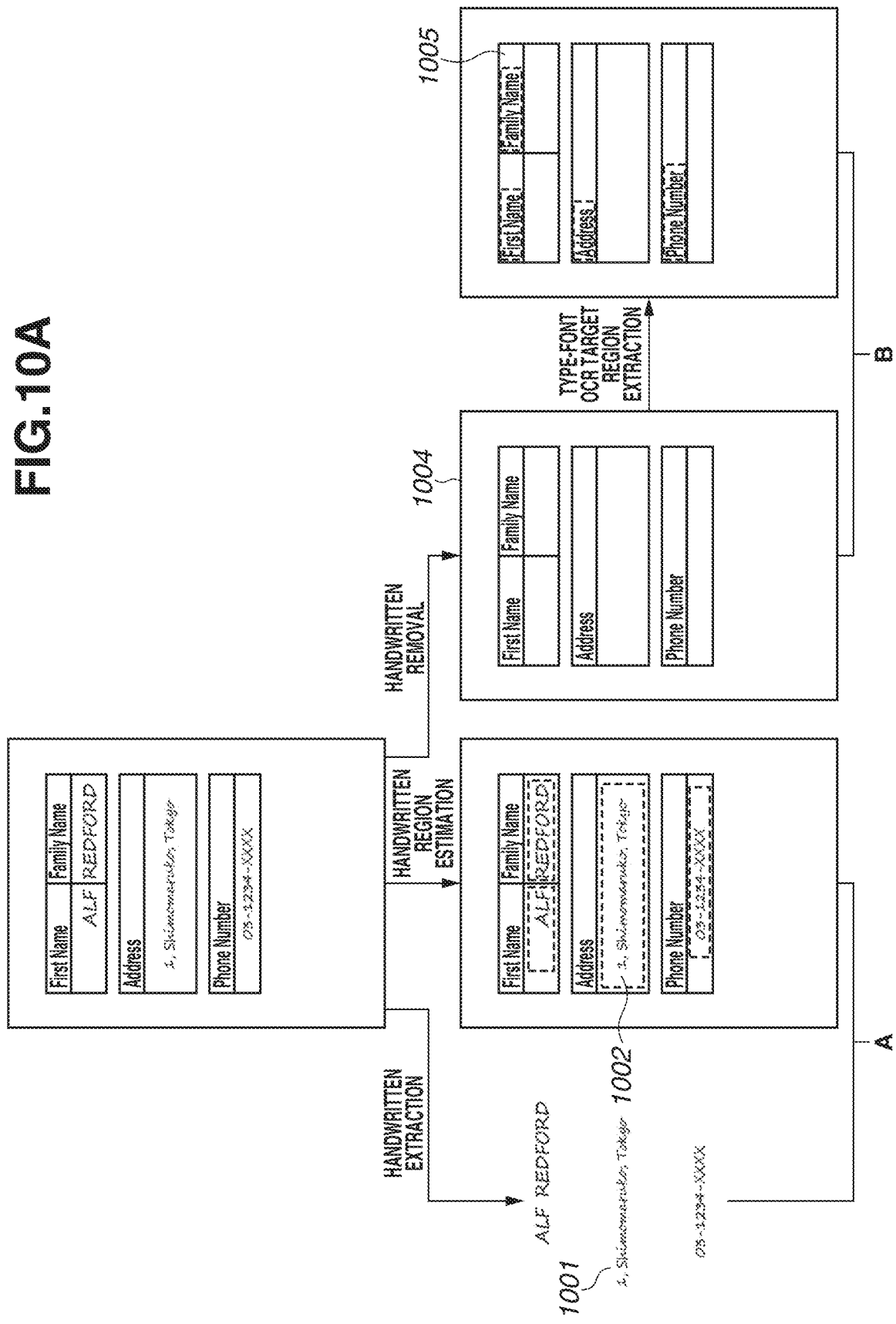

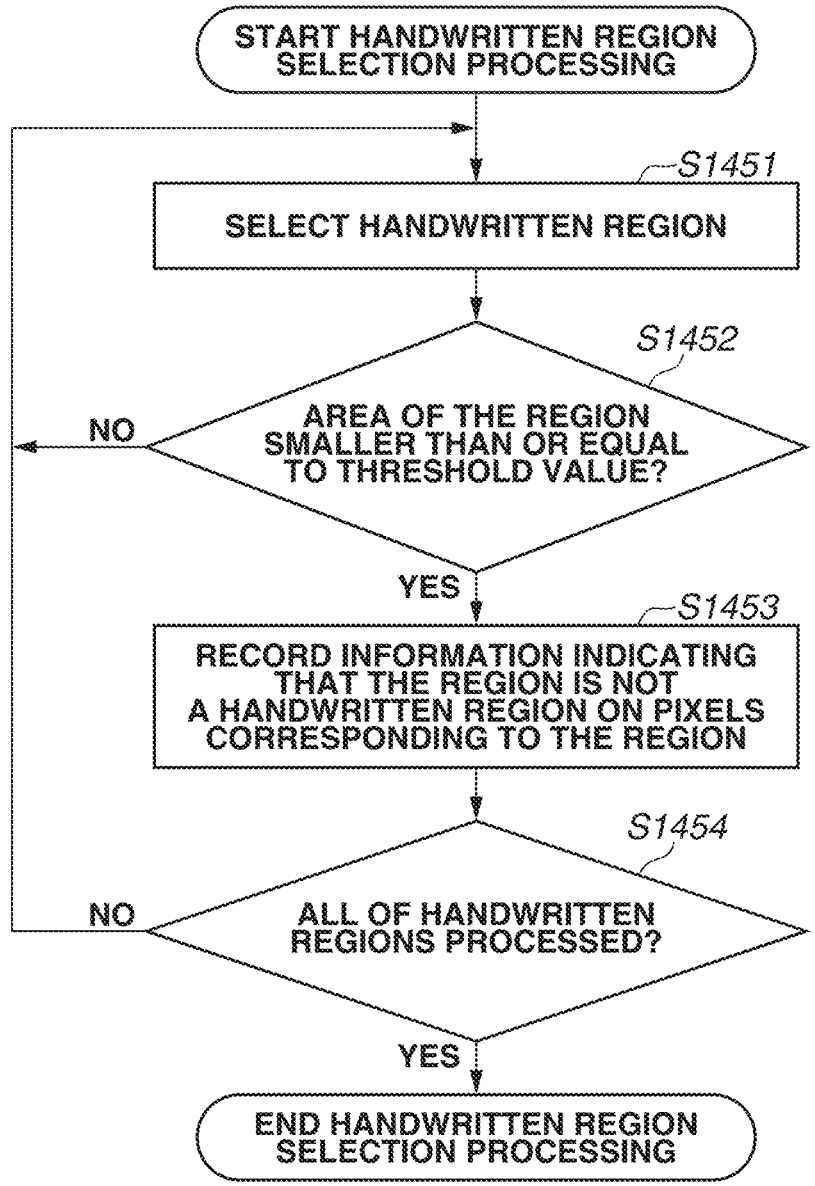

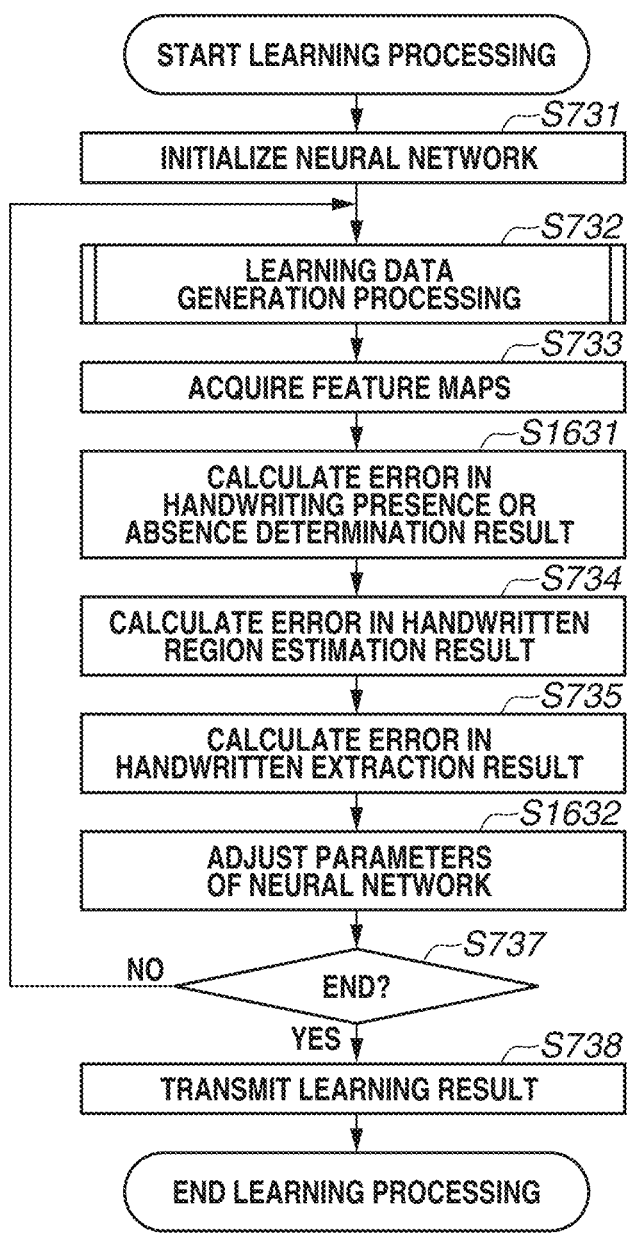

| First Name | Family Name |
|---|---|
| ALF | REDFORD |

| Address |
|---|
| 1, Shimomaruko, Tokyo |

| Phone Number |
|---|
| 03-1234-XXXX |

IMAGE PROCESSING SYSTEM, IMAGE PROCESSING METHOD, AND STORAGE MEDIUM EACH FOR OBTAINING PIXELS OF OBJECT USING NEURAL NETWORK

BACKGROUND

Field

Aspects of the present disclosure generally relate to an image processing system, an image processing method, and a storage medium each for obtaining pixels of an object using a neural network.

Description of the Related Art

Recently, an operation of scanning a paper document, such as a business form, with characters written therein by the user and performing handwritten optical character recognition (OCR) processing on an image obtained by such scanning to computerize (convert into digital data) the handwritten characters has been being performed.

It is desirable that a partial image representing handwritten characters be separated from a scanned image obtained by scanning a business form with the handwritten characters put thereon and be input to a handwritten OCR engine for performing handwritten OCR. The reason for this is that, since the handwritten OCR engine is optimized for recognizing handwritten characters, if a character image printed with a specific character font such as a type font or a graphic with, for example, an icon printed therein is included in an image input to the handwritten OCR engine, the recognition accuracy of the handwritten OCR engine may decrease.

Accordingly, it is conceivable for the handwritten OCR engine to process an image obtained by extracting only pixels of handwritten characters. For example, FIG. 22A illustrates an example of an image of a business form with a full name handwritten thereon, and FIG. 22B illustrates an image obtained by extracting pixels of handwritten characters from the image illustrated in FIG. 22A (i.e., illustrates an image obtained by converting pixels of ruled lines and type-font characters into white pixels). On the other hand, with regard to the image illustrated in FIG. 22A, the presence of ruling lines enables seeing that the handwritten content is "ALF" and "REDFORD". However, if the handwritten OCR engine has performed recognition processing on the image obtained by extracting only pixels of handwritten characters illustrated in FIG. 22B, a delimiting position of such a handwritten character string is unclear, the handwritten character string may be recognized as "ALFRED" and "FORD". It is desirable that partial images obtained by division for the respective regions of entry columns be individually input to the handwritten OCR engine.

On the other hand, recently, in the field of image recognition, a neural network has been attracting attention. For example, there is known a neural network which is used to classify pixels included in an image into predetermined categories (classes) and is configured with an encoder and a decoder. This neural network causes the encoder to perform computation of convolution on an input image and output a feature map for discriminating classes of the respective pixels of the image. Then, the neural network causes the decoder to perform computation of deconvolution on the feature map output from the encoder and output an image composed of probability values each indicating to which class each pixel of the input image belongs (i.e., a probability map).

There is a proposal of applying the neural network for performing category classification to a task of separating a scanned image into an image of handwritten characters and an image other than the image of handwritten characters and extracting pixels of the handwritten characters from the input image. "Recognizing Challenging Handwritten Annotations with Fully Convolutional Networks", 16th International Conference on Frontiers in Handwriting Recognition 2018, discusses performing category classification for discriminating whether each pixel included in an input image is a pixel constituting handwritten characters. Furthermore, in the following description, processing for classifying and extracting pixels constituting handwritten characters is referred to "handwritten extraction", a pixel extracted by the handwritten extraction is referred to as a "handwritten extracted pixel", and an image obtained by the handwritten extraction is referred to as a "handwritten extracted image".

Moreover, "Handwritten Text Line Segmentation Using Fully Convolutional Network", 2017 14th IAPR International Conference on Document Analysis and Recognition, discusses applying a neural network for performing category classification to a task of classifying regions with characters written therein included in a business form image (regions of entry columns) and thus creating a neural network for estimating and outputting a region including a handwritten entry on an input image. Furthermore, in the following description, processing for estimating a region including a handwritten entry is referred to as "handwritten region estimation". Moreover, a region obtained by the handwritten region estimation is referred to as a "handwritten region".

Moreover, on the other hand, it is generally known that a neural network requires a large amount of calculation. In a case where both processing operations for the handwritten region estimation and the handwritten extraction mentioned above (i.e., a plurality of tasks) are configured with a plurality of neural networks adapted for the respective processing operations, two neural networks are required and, therefore, an increase in computational load is more conspicuous.

Moreover, Japanese Patent Application Laid-Open No. 2019-177032 discusses a neural network capable of integrating parts of processing operations of encoders of neural networks which are in common between a plurality of tasks, thus reducing the amount of calculation.

According to the technique discussed in Japanese Patent Application Laid-Open No. 2019-177032, it is possible to reduce the amount of calculation by sharing calculations in encoder units between a plurality of neural networks. However, even if the technique discussed in Japanese Patent Application Laid-Open No. 2019-177032 is used, the amount of calculation in decoder units is still large.

SUMMARY

According to an aspect of the present disclosure, an image processing apparatus includes at least one memory that stores instructions, and at least one processor that executes the instructions to perform obtaining a region including an object targeted for recognition included in a processing target image using a neural network, and obtaining pixels corresponding to the object targeted for recognition included in the processing target image using the neural network, wherein the neural network includes an encoder unit configured to obtain a feature map by performing convolutional processing on the processing target image, a first decoder unit configured to obtain a region including the object targeted for recognition based on the feature map, a partial feature map obtainment unit configured to obtain, from the feature map, a partial feature map of a portion corresponding to the region including the object targeted for recognition obtained by the first decoder unit, and a second decoder unit configured to obtain pixels corresponding to the object targeted for recognition based on the partial feature map.

Further features of the present disclosure will become apparent from the following description of exemplary embodiments with reference to the attached drawings.

BRIEF DESCRIPTION OF THE DRAWINGS

FIG. 3A is a diagram illustrating a learning sequence of the image processing system.

FIG. 3B is a diagram illustrating a usage sequence of the image processing system.

FIG. 6C is a flowchart illustrating the flow of correct answer data generation processing.

FIG. 8A is a diagram illustrating a configuration example of learning data for handwritten extraction. FIG. 8B is a diagram illustrating a configuration example of learning data for handwritten region estimation.

FIGS. 10A and 10B are diagrams illustrating an outline of data generation processing in the business form conversion-to-text processing.

FIG. 14B is a flowchart illustrating the flow of handwritten region selection processing in the second exemplary embodiment.

FIG. 16B is a flowchart illustrating the flow of learning processing in the third exemplary embodiment.

FIGS. 18A, 18B, 18C, and 18D are diagrams illustrating examples of business forms in a fourth exemplary embodiment.

DESCRIPTION OF THE EMBODIMENTS

Various exemplary embodiments, features, and aspects of the present disclosure will be described in detail below with reference to the drawings. Furthermore, the configuration for implementing the present disclosure is not limited to only configurations described in the exemplary embodiments. Some portions of the configurations described in the exemplary embodiments can be omitted or be replaced with their equivalents within a scope which allows similar advantageous effects to be attained.

Furthermore, in the following description, performing optical character recognition (OCR) on a handwritten extracted image is referred to as "handwritten OCR". Handwritten OCR is able to be used to convert handwritten characters into text data (into digital data).

A first exemplary embodiment is directed to an example of an operation for performing handwritten region estimation and handwritten extraction using a neural network and reducing the amount of calculation of the neural network.

<Image Processing System>

Figure 1:
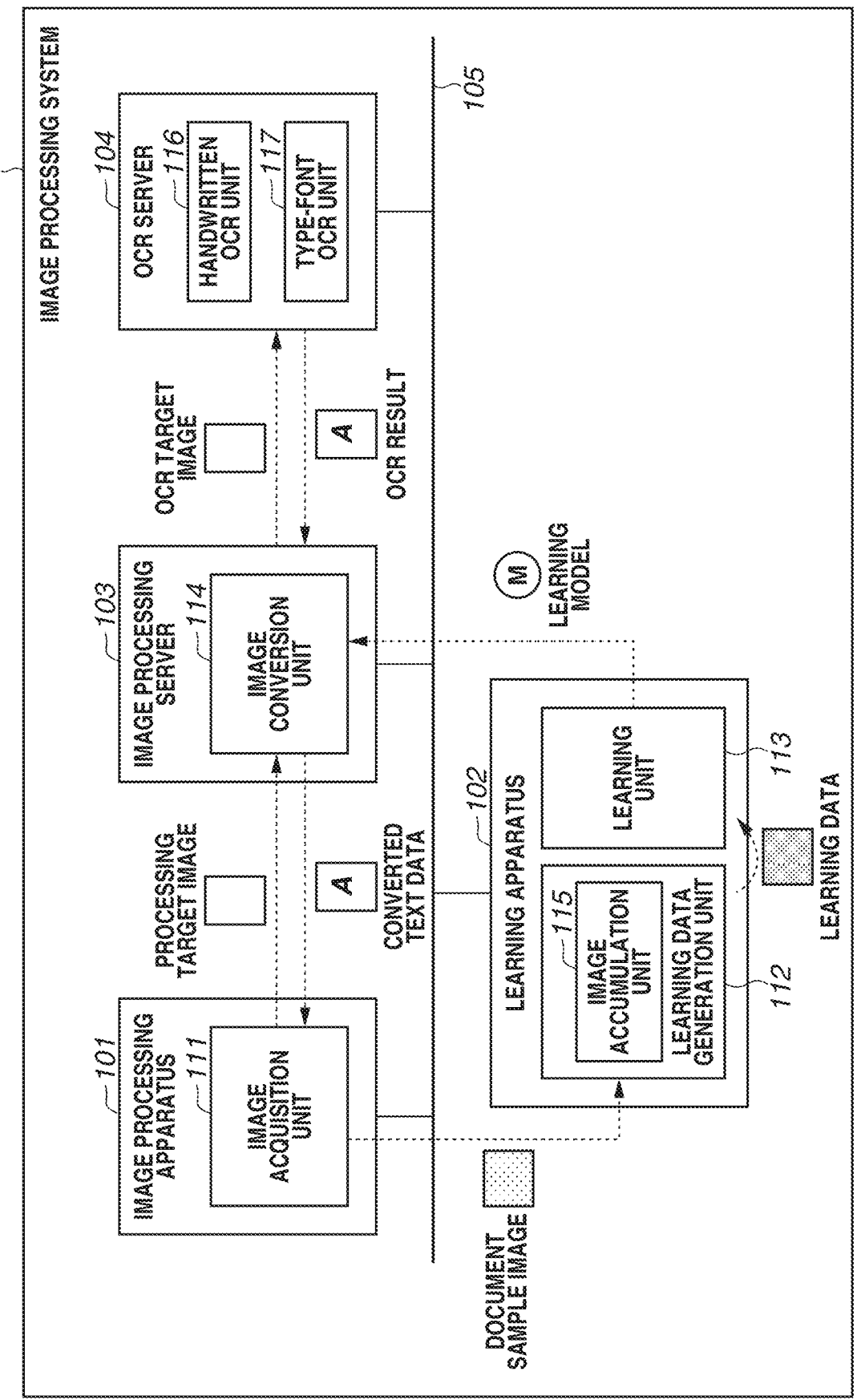
FIG. 1 is a diagram illustrating a configuration of an image processing system.

FIG. 1 is a diagram illustrating a configuration of an image processing system 100. The image processing system 100 includes an image processing apparatus 101, a learning apparatus 102, an image processing server 103, and an OCR server 104. The image processing apparatus 101, the learning apparatus 102, the image processing server 103, and the OCR server 104 are interconnected via a network 105.

The image processing apparatus 101 is what is called a digital multifunction peripheral (MFP), and includes a printing function and a scanning function (i.e., a function serving as an image acquisition unit 111).

In the case of performing learning about business forms, the image processing apparatus 101 scans a plurality of sheets of documents such as business forms serving as samples to generate a plurality of pieces of image data (hereinafter, these pieces of image data being referred to as "document sample images"). Documents serving as samples include documents with characters handwritten therein. Then, the image processing apparatus 101 transmits the document sample images to the learning apparatus 102 via the network 105, thus causing the learning apparatus 102 to perform learning processing about business forms.

Moreover, in the case of performing processing of a business form image, the image processing apparatus 101 scans a document including an object targeted for recognition (handwritten characters) to obtain image data (hereinafter, this image data being referred to as a "processing target image"). Then, the image processing apparatus 101 transmits the obtained processing target image to the image processing server 103 via the network 105, thus causing the image processing server 103 to perform recognition processing of a business form.

The learning apparatus 102 functions as an image accumulation unit 115, which accumulates the document sample images generated by the image processing apparatus 101. Moreover, the learning apparatus 102 also functions as a learning data generation unit 112, which generates learning data from the thus-accumulated images. The learning data is data used to perform learning of a neural network which performs handwritten region estimation and handwritten extraction. The learning apparatus 102 also functions as a learning unit 113, which performs learning of a neural network using the generated learning data. Learning processing by the learning unit 113 is used to generate a learning result (for example, parameters of the neural network). The learning apparatus 102 transmits a learning result (learning model) to the image processing server 103 via the network 105. The neural network in the first exemplary embodiment is described below with reference to FIG. 11.

The image processing server 103 functions as an image conversion unit 114, which converts a processing target image. The image conversion unit 114 generates an image targeted for handwritten OCR from the processing target image. Thus, the image conversion unit 114 performs handwritten region estimation on the processing target image generated by the image processing apparatus 101. The image processing server 103 estimates (identifies) a region with characters handwritten therein included in the processing target image by the neural network making an inference with use of the learning result generated by the learning apparatus 102. This results in obtaining a handwritten region. Here, the handwritten region is information indicating a partial region included in the processing target image, and is expressed as, for example, information including a specific pixel position (coordinates) on the processing target image and the width and height from the specific pixel position. Moreover, the handwritten region may include a plurality of handwritten regions depending on the number of items written in a business form. Additionally, the image conversion unit 114 performs handwritten extraction in the handwritten region obtained by the handwritten region estimation. At this time, the image processing apparatus 101 extracts (identifies) pixels (pixel positions) of handwritten characters included in the handwritten region by the neural network making an inference with use of the learning result generated by the learning apparatus 102. Then, the image processing apparatus 101 obtains a handwritten extracted image. Here, the handwritten region is a region which is sectioned based on, for example, individual entry columns in the processing target image. On the other hand, the handwritten extracted image is an image obtained by identifying pixels of handwritten characters in the handwritten region. Thus, even if a part of type-font characters is included in the handwritten region, since only the pixels of handwritten characters are identified in the handwritten extracted image, pixels of type-font characters are not included in the handwritten extracted image. Accordingly, performing processing based on results of handwritten region estimation and handwritten extraction enables treating only the handwritten characters included in the processing target image while distinguishing them for the respective individual entry columns. Then, the image conversion unit 114 transmits the handwritten extracted image to the OCR server 104. Thus, the image conversion unit 114 instructs the OCR server 104 to set the handwritten extracted image, which has been obtained by extracting handwritten characters included in the estimated handwritten region, as a target region for handwritten OCR. Moreover, the image conversion unit 114 refers to the handwritten region and handwritten extracted image and thus generates an image (hereinafter referred to as a "type-font image") obtained by removing pixels of handwritten characters from a specific pixel position (coordinates) on the processing target image. Then, the image conversion unit 114 generates information about a region (hereinafter referred to as a "type-font region") which is a region on the type-font image and includes type-font characters targeted for type-font OCR. Generation of the type-font region is described below. Then, the image conversion unit 114 transmits the type-font image and the type-font region to the OCR server 104. Thus, the image conversion unit 114 instructs the OCR server 104 to perform type-font OCR with respect to the type-font region on the type-font image. The image conversion unit 114 receives a result of the handwritten OCR and a result of the type-font OCR from the OCR server 104. Then, the image conversion unit 114 integrates the received results into text data and transmits the text data to the image processing apparatus 101. Hereinafter, the text data is referred to as "business form text data".

The OCR server 104 includes functions serving as a handwritten OCR unit 116, which is suitable for performing character recognition of handwritten characters, and a type-font OCR unit 117, which is suitable for performing character recognition of type-font characters. Upon receiving a handwritten extracted image, the OCR server 104 causes the handwritten OCR unit 116 to perform handwritten OCR processing on the handwritten extracted image to obtain text data (OCR result). The handwritten OCR unit 116 transmits the obtained text data to the image processing server 103. Moreover, upon receiving a type-font image and a type-font region, the OCR server 104 causes the type-font OCR unit 117 to perform type-font OCR processing on the type-font region included in the type-font image to obtain text data. The type-font OCR unit 117 transmits the obtained text data to the image processing server 103.

<Configuration of Neural Network>

Figure 11:
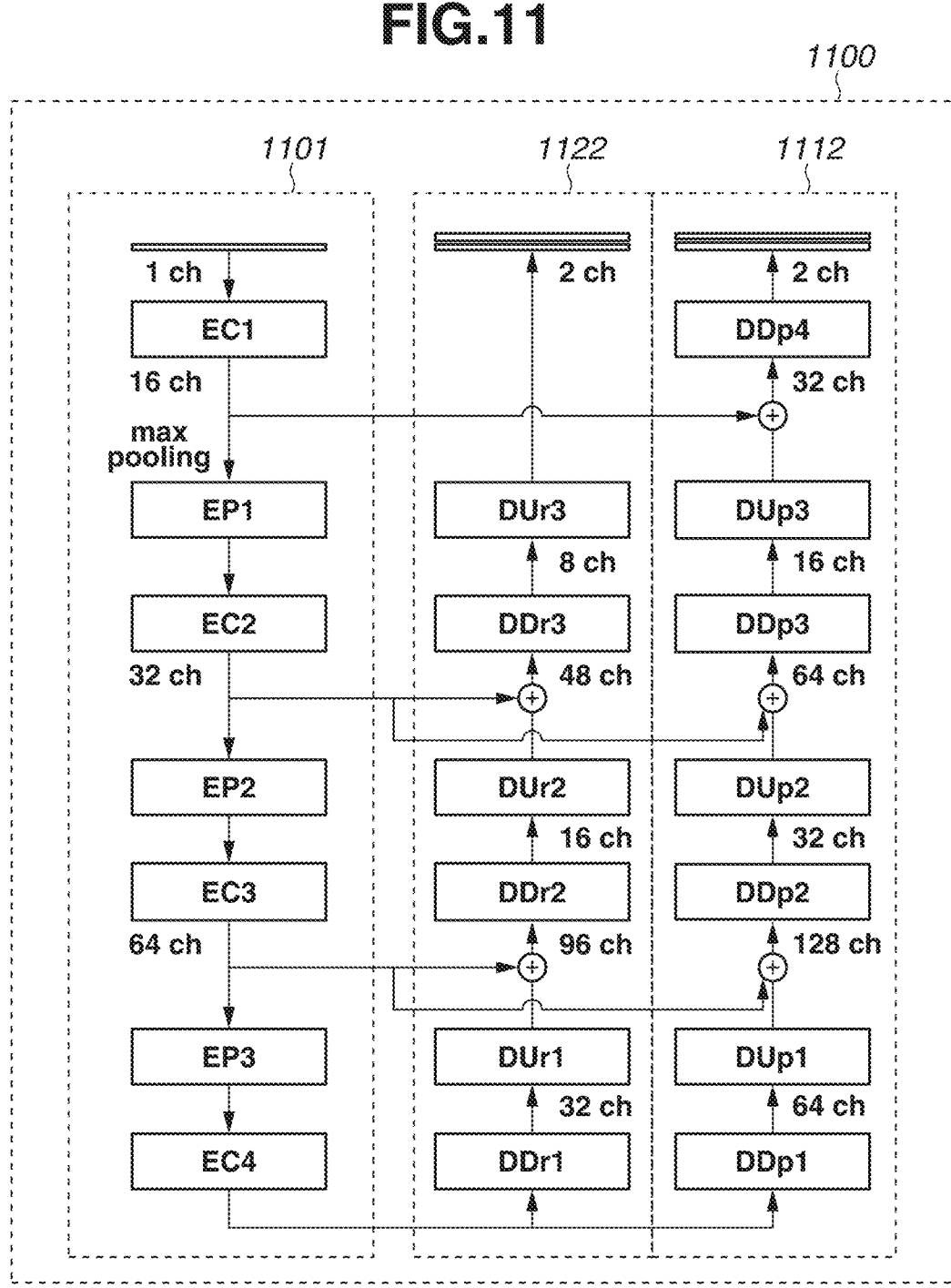
FIG. 11 is a diagram illustrating a configuration of a neural network.

A configuration of the neural network in the present system is described. FIG. 11 is a diagram illustrating a configuration of the neural network 1100. The neural network 1100 in the first exemplary embodiment performs a plurality of types of processing operations with respect to inputting of an image. Thus, the neural network 1100 performs handwritten region estimation and handwritten extraction on an input image. Therefore, the neural network 1100 in the first exemplary embodiment has a configuration obtained from a combination of a plurality of neural networks which processes respective different tasks. In the example illustrated in FIG. 11, the neural network 1100 has a configuration obtained from a combination of a handwritten region estimation neural network and a handwritten extraction neural network. The handwritten region estimation neural network and the handwritten extraction neural network share an encoder, the details of which are described below. Furthermore, in the first exemplary embodiment, an image to be input to the neural network 1100 is assumed to be a grayscale (one-channel) image, but can be another type of image such as a color (three-channel) image.

The neural network 1100 includes, as illustrated in FIG. 11, an encoder unit 1101, a pixel extraction decoder unit 1112, which is involved in handwritten extraction, and a region estimation decoder unit 1122, which is involved in handwritten region estimation. The encoder unit 1101 and the pixel extraction decoder unit 1112 constitute the handwritten region estimation neural network. Moreover, the encoder unit 1101 and the region estimation decoder unit 1122 constitute the handwritten region estimation neural network. Such two neural networks share the encoder unit 1101, which is a layer that performs similar calculations in the two neural networks. Then, switching is performed between the pixel extraction decoder unit 1112 and the region estimation decoder unit 1122 depending on tasks. Upon receiving an input image, the neural network 1100 performs calculation in the encoder unit 1101. Then, the neural network 1100 inputs a result of the calculation (a feature map) to the pixel extraction decoder unit 1112 and the region estimation decoder unit 1122, and then outputs a handwritten extraction result via a calculation in the pixel extraction decoder unit 1112 and outputs a handwritten region estimation result via a calculation in the region estimation decoder unit 1122.

The encoder unit 1101 includes convolutional layers EC1, EC2, EC3, and EC4 and pooling layers EP1, EP2, and EP3. The convolutional layers EC1, EC2, EC3, and EC4 perform, on the respective inputs, computations of convolution with filters having respective predetermined kernel sizes to extract features, thus outputting feature maps for a predetermined number of channels. Here, the feature map is a set of pieces of feature information about a handwritten entry. Outputs of the convolutional layers EC1, EC2, EC3, and EC4 and the pooling layers EP1, EP2, and EP3 are feature maps. Furthermore, the convolutional layer EC1 receives an input image, and the convolutional layers EC2, EC3, and EC4 receive feature maps output from the respective immediately preceding layers (pooling layers (described below)). The pooling layers EP1, EP2, and EP3 output maximum values for the respective predetermined kernel size regions to feature maps output from the respective immediately preceding convolutional layers EC1, EC2, and EC3, thus extracting more important feature information from the input feature maps. In this way, the encoder unit 1101 converts an input image into feature information required for handwritten region estimation and handwritten extraction. Furthermore, in the first exemplary embodiment, for example, the pooling layers EP1, EP2, and EP3 reduce the resolutions of the respective input feature maps to half and output the feature maps with the reduced resolutions.

The pixel extraction decoder unit 1112 includes deconvolutional layers DDp1, DDp2, DDp3, and DDp4 and upsampling layers DUp1, DUp2, and DUp3. The deconvolutional layers DDp1, DDp2, DDp3, and DDp4 perform, on the respective input feature maps, computations of deconvolution with filters having respective predetermined kernel sizes. Then, the deconvolutional layers DDp1, DDp2, DDp3, and DDp4 convert feature information included in the feature maps and progressively estimate classes of the respective pixels of the input image (whether the pixel of interest is a handwritten pixel). The upsampling layers DUp1, DUp2, and DUp3 increase the resolutions of the respective feature maps output from the respective immediately preceding deconvolutional layers DDp1, DDp2, and DDp3, thus restoring the resolutions reduced by the pooling layers EP1, EP2, and EP3. Furthermore, in the first exemplary embodiment, for example, the upsampling layers DUp1, DUp2, and DUp3 double the resolutions of the respective input feature maps and output the respective feature maps with the doubled resolutions. Furthermore, the deconvolutional layer DDp4 outputs images for the respective classes in which the class probability value of each pixel of the input image has been estimated (the number of images to be output being the number of channels=the number of classes required for classification). The pixel extraction decoder unit 1112 normalizes outputs of the deconvolutional layer DDp4 into a probability distribution and outputs a map representing the probabilities of the respective classes for each pixel. Then, the pixel extraction decoder unit 1112 divides pixels for the respective classes having the highest probability and performs imaging of the pixels, thus outputting a handwritten extracted image. Here, as a method of normalization into a probability distribution, for example, a softmax function is used. Handwritten extraction is performed by a sub-network including the encoder unit 1101 and the pixel extraction decoder unit 1112.

In the above-mentioned calculation by the pixel extraction decoder unit 1112, since the resolutions of the feature maps are decreased via the pooling layers EP1, EP2, and EP3, feature maps to be calculated by the pixel extraction decoder unit 1112 have a loss of local features. Therefore, feature maps which the encoder unit 1101 has extracted during the processing stage are passed to the pixel extraction decoder unit 1112 to increase the estimation accuracy of the class probability values. Thus, the output of the convolutional layer EC3 is connected to the output of the upsampling layer DUp1, the output of the convolutional layer EC2 is connected to the output of the upsampling layer DUp2, and the output of the convolutional layer EC1 is connected to the output of the upsampling layer DUp3. Hereinafter, this processing method is referred to as "skip connection".

The region estimation decoder unit 1122 includes deconvolutional layers DDr1, DDr2, and DDr3 and upsampling layers DUr1, DUr2, and DUr3. The deconvolutional layers DDr1, DDr2, and DDr3, which constitute the region estimation decoder unit 1122, perform respective operations similar to those of the deconvolutional layers DDp1, DDp2, and DDp3, which constitute the pixel extraction decoder unit 1112. The upsampling layers DUr1, DUr2, and DUr3 also perform respective operations similar to those of the upsampling layers DUp1, DUp2, and DUp3, which constitute the pixel extraction decoder unit 1112. Furthermore, the upsampling layer DUr3 outputs images for the respective classes in which the class probability value of each pixel of the input image has been estimated (the number of images to be output being the number of channels=the number of classes required for classification). The region estimation decoder unit 1122 normalizes outputs of the upsampling layer DUr3 into a probability distribution and outputs a map representing the probabilities of the respective classes for each pixel. Then, the region estimation decoder unit 1122 divides pixels for the respective classes having the highest probability and estimates a handwritten region. Here, as a method of normalization into a probability distribution, for example, a softmax function is used. Handwritten region estimation is performed by a sub-network including the encoder unit 1101 and the region estimation decoder unit 1122.

Then, even in the calculation by the region estimation decoder unit 1122, skip connection is introduced to increase the estimation accuracy of the class probability values. Thus, the output of the convolutional layer EC3 is connected to the output of the upsampling layer DUr1, and the output of the convolutional layer EC2 is connected to the output of the upsampling layer DUr2.

Furthermore, while, in the first exemplary embodiment, an example in which one convolutional layer is arranged between pooling layers in the encoder unit 1101 has been described, a plurality of convolutional layers can be arranged therebetween. Moreover, an example in which one deconvolutional layer is arranged between upsampling layers in each of the region estimation decoder unit 1122 and the pixel extraction decoder unit 1112 has been described, a plurality of deconvolutional layers can be arranged therebetween. Moreover, in a case where a convolutional layer and the subsequent pooling layer are treated as a constituent unit, while, in the first exemplary embodiment, three constituent units are provided in the region estimation decoder unit 1122, more than three or less than three constituent units can be provided therein. Moreover, in a case where an upsampling layer and the subsequent deconvolutional layer are treated as a constituent unit, in the first exemplary embodiment, two constituent units are provided in the region estimation decoder unit 1122 and three constituent units are provided in the pixel extraction decoder unit 1112. However, the first exemplary embodiment is not limited to this, and more than such a number or less than such a number of constituent units can be provided therein. Moreover, while, in the first exemplary embodiment, an example in which each pooling layer outputs a maximum value has been described, another configuration in which, for example, each pooling layer outputs an average value of feature map pixels corresponding to a kernel can be employed.

The above-mentioned region estimation decoder unit 1122 has a configuration similar to that of the pixel extraction decoder unit 1112 except for the deconvolutional layer DDp4, but can be configured to have a configuration in which the amount of calculation is smaller than that of the pixel extraction decoder unit 1112. For example, with regard to the deconvolutional layers DDr1, DDr2, and DDr3 of the region estimation decoder unit 1122, the number of output channels of each layer is set to half of the number of output channels of each of the deconvolutional layers DDp1, DDp2, and DDp3 of the pixel extraction decoder unit 1112, which perform operations similar to those of the deconvolutional layers DDr1, DDr2, and DDr3. Moreover, similarly, with regard to the upsampling layers DUr1, DUr2, and DUr3 of the region estimation decoder unit 1122, the number of output channels of each layer is set to half of the number of output channels of each of the upsampling layers DUp1, DUp2, and DUp3 of the pixel extraction decoder unit 1112. The reason for this is that a handwritten extraction task, which extracts pixels of a handwritten portion one by one, and a handwritten region estimation task, which estimates a region of an aggregation of pixels of a handwritten portion, differ in level of difficulty. Thus, the region estimation decoder unit 1122, which processes the handwritten region estimation task lower in level of difficulty than the handwritten extraction task, is able to be configured as a small-scale neural network smaller in the amount of calculation than the pixel extraction decoder unit 1112. Simplifying the configuration of the region estimation decoder unit 1122 enables reducing the amount of calculation to a greater extent than performing handwritten region estimation with a complicated configuration equivalent to that of the pixel extraction decoder unit 1112. Furthermore, in the first exemplary embodiment, an example in which the scale of the neural network is made smaller by reducing the number of convolutional layers or decreasing the number of output channels of each convolutional layer has been described. Not only the number of convolutional layers or the number of output channels of each convolutional layer but also, for example, the number of times of convolution of each convolutional layer can be reduced.

In the above-described neural network 1100, as mentioned above, the pixel extraction decoder unit 1112 and the region estimation decoder unit 1122 share calculation performed by the encoder unit 1101. Thus, feature maps output from the encoder unit 1101 are set as inputs to the pixel extraction decoder unit 1112 and the region estimation decoder unit 1122. Here, handwritten pixels are pixels existing in a handwritten region. Therefore, feature maps obtained by narrowing down the input image to a portion corresponding to a handwritten region estimated by the region estimation decoder unit 1122 are obtained and input to the pixel extraction decoder unit 1112. This enables reducing the amount of calculation required to perform handwritten extraction in a non-handwritten region in which no handwritten pixels exist and thus decreasing the amount of calculation. This is described below with reference to FIGS. 9A and 9B and FIG. 13.

<Learning Sequence>

A learning sequence in the present system is described. FIG. 3A is a diagram illustrating a learning sequence of the image processing system 100.

When, in step S301, the user issues an instruction to the image processing apparatus 101 to read a document, then in step S302, the image acquisition unit 111 reads the document to generate a document sample image.

In step S303, the image acquisition unit 111 transmits the document sample image generated in the above-mentioned way to the learning data generation unit 112. Furthermore, the image acquisition unit 111 can append identification (ID) information to the document sample image. This ID information is, for example, information for identifying the image processing apparatus 101 serving as the image acquisition unit 111. Furthermore, the ID information can be user identification information for identifying a user who operates the image processing apparatus 101 or group identification information for identifying a group to which the user belongs.

In step S304, upon receiving the transmitted document sample image, the learning data generation unit 112 accumulates the document sample image in the image accumulation unit 115.

In step S305, when the user issues an instruction to the learning apparatus 102 to append correct answer data concerning the document sample image, the learning data generation unit 112 acquires the correct answer data. Then, in step S306, the learning data generation unit 112 accumulates the correct answer data in the image accumulation unit 115 while associating the correct answer data with the document sample image. The correct answer data is data used for learning of a neural network. The method of appending the correct answer data is described below. Then, in step S307, the learning data generation unit 112 generates learning data based on the pieces of data accumulated in the above-mentioned way. At this time, the learning data generation unit 112 can generate learning data using only a document sample image that is based on specific ID information. After that, in step S308, the learning data generation unit 112 transmits the learning data to the learning unit 113. In the case of having generated learning data using only an image that is based on specific ID information, the learning data generation unit 112 also transmits the ID information together with the learning data. In step S309, the learning unit 113 performs learning processing based on the received learning data and updates a learning model. The learning unit 113 can retain a learning model for each piece of ID information and perform learning with only learning data corresponding to the ID information. Associating ID information and a learning model with each other in the above-mentioned way enables building out a learning model specialized for a specific usage environment.

<Usage Sequence>

A usage sequence in the present system is described. FIG. 3B is a diagram illustrating a usage sequence of the image processing system 100.

Figure 4A:
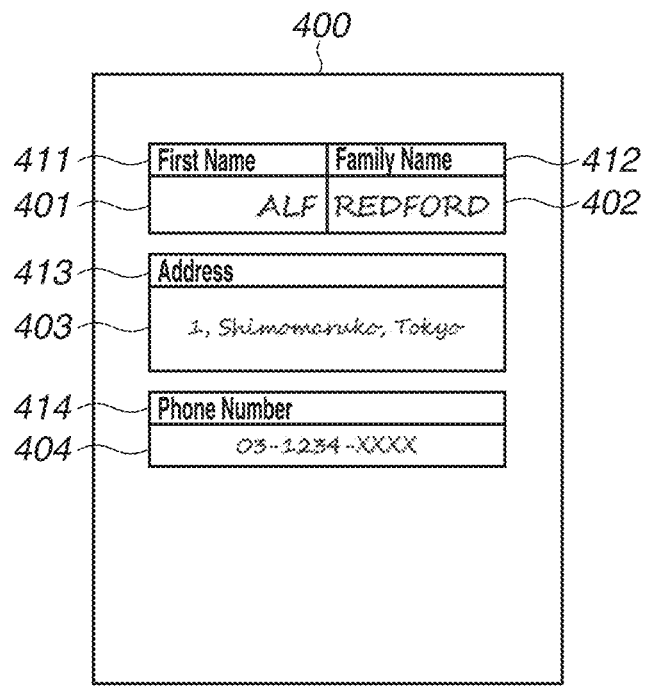
FIGS. 4A, 4B, 4C, and 4D illustrate examples of business forms.
Figure 4B:
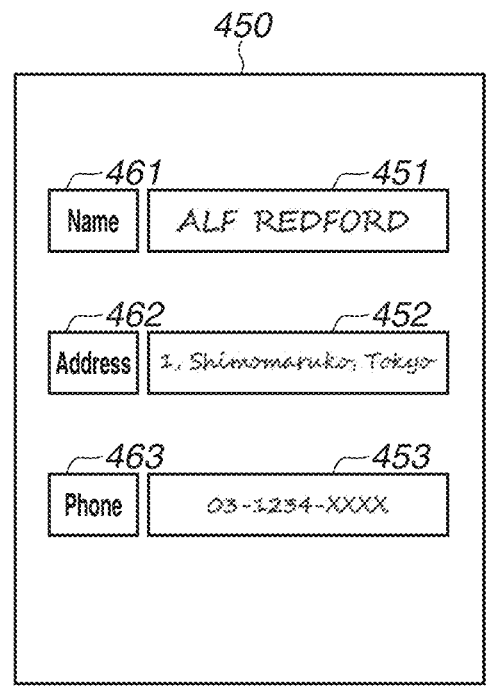

When, in step S351, the user issues an instruction to read a document (business form), then in step S352, the image acquisition unit 111 reads the document to generate a processing target image. Here, the image to be read is, for example, a business form 400 illustrated in FIG. 4A or a business form 450 illustrated in FIG. 4B. These business forms include entry columns for names (a first name entry column 401 and a family name entry column 402 and a name entry column 451), address entry columns 403 and 452, and phone number entry columns 404 and 453, in which the name, address, and phone number have been respectively entered in handwriting. Moreover, each of headings 411, 412, 413, 414, 461, 462, and 463 of item names corresponding to the respective entry columns contains an image of type-font characters previously printed on the document. Furthermore, since the arrangement of these entry columns (a layout of the business form) is determined by a business form creation source, an image which differs for each read business form (i.e., an image of what is called an atypical business form) can be generated.

In step S353, the image acquisition unit 111 transmits the processing target image read in the above-mentioned way to the image conversion unit 114. Furthermore, at this time, the image acquisition unit 111 can append ID information to the data to be transmitted.

In step S354, upon receiving the transmitted data, the image conversion unit 114 receives an instruction to convert the processing target image into text data. At this time, the image conversion unit 114 stores information about the image acquisition unit 111 as a reply destination for data. In step S355, when having received an instruction to modify handwritten characters, the image conversion unit 114 requests the updated learning model from the learning unit 113. In step S356, in response to the request from the image conversion unit 114, the learning unit 113 transmits the updated learning model to the image conversion unit 114. In a case where the designated ID information is included in the request made by the image conversion unit 114, the learning unit 113 transmits a learning model corresponding to the ID information. In step S357, the image conversion unit 114 performs handwritten region estimation and handwritten extraction with respect to the processing target image based on the acquired learning model. Then, in step S358, the image conversion unit 114 transmits a handwritten extracted image generated for each handwritten region to the handwritten OCR unit 116. In step S359, the handwritten OCR unit 116 performs handwritten OCR processing on the handwritten extracted image to generate text data (handwritten). In step S360, the handwritten OCR unit 116 transmits the generated text data (handwritten) to the image conversion unit 114. Then, in step S361, the image conversion unit 114 generates a type-font image and a type-font region from the processing target image. Then, in step S362, the image conversion unit 114 transmits the type-font image and the type-font region to the type-font OCR unit 117. In step S363, the type-font OCR unit 117 performs type-font OCR processing on the type-font image to generate text data (type-font). Then, in step S364, the type-font OCR unit 117 transmits the generated text data (type-font) to the image conversion unit 114. Then, in step S365, the image conversion unit 114 generates business form text data based on at least the text data (handwritten) and the text data (type-font). In step S366, the image conversion unit 114 transmits the business form text data to the image acquisition unit 111. In step S367, upon receiving the business form text data, the image acquisition unit 111 presents a usage screen for the business form text data to the user. After this, the image acquisition unit 111 outputs the business form text data according to a usage application of the business form text data. For example, the image acquisition unit 111 transmits the business form text data to a business system (not illustrated) externally provided separately from the image processing system 100.

<Apparatus Configurations>

Figure 2A:
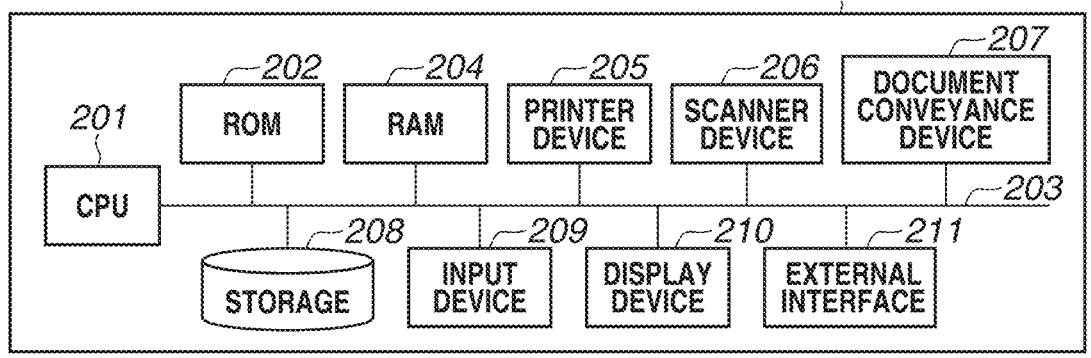
FIG. 2A is a diagram illustrating a configuration of an image processing apparatus.
Figure 2B:
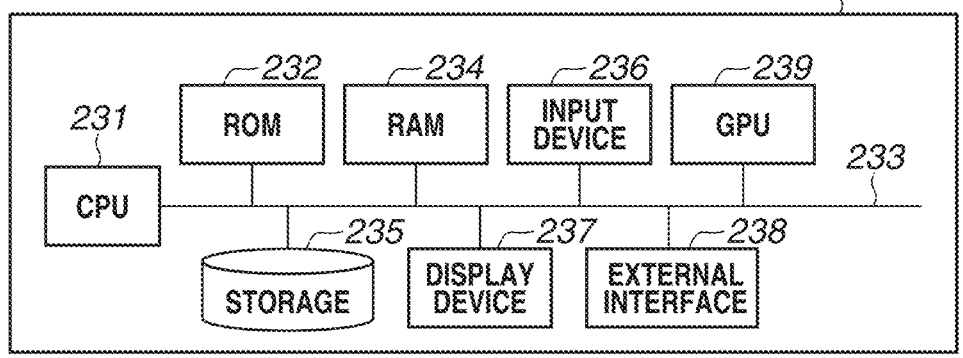
FIG. 2B is a diagram illustrating a configuration of a learning apparatus.
Figure 2C:
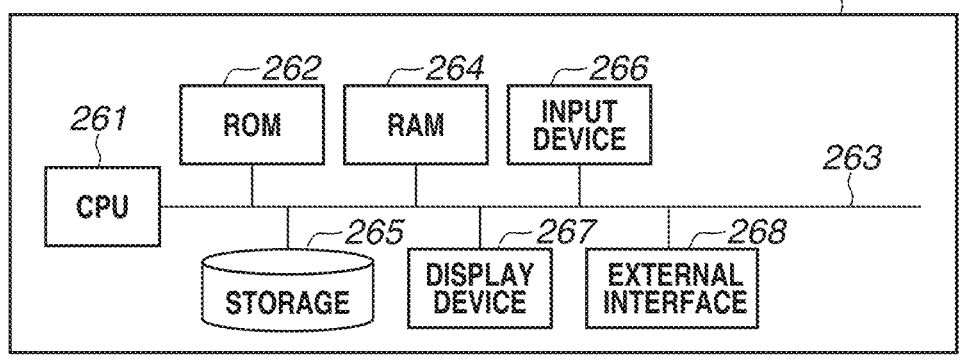
FIG. 2C is a diagram illustrating a configuration of an image processing server.
Figure 2D:
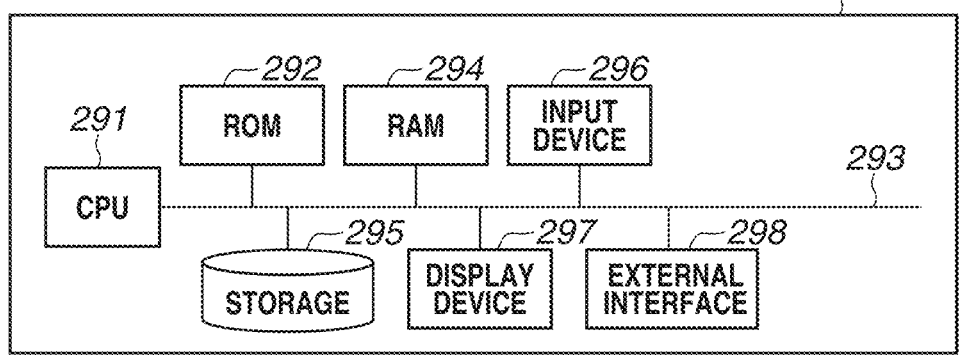
FIG. 2D is a diagram illustrating a configuration of an optical character recognition (OCR) server.

To implement the above-described system, the respective apparatuses have the following configurations. FIG. 2A is a diagram illustrating a configuration of the image processing apparatus 101. FIG. 2B is a diagram illustrating a configuration of the learning apparatus 102. FIG. 2C is a diagram illustrating a configuration of the image processing server 103. FIG. 2D is a diagram illustrating a configuration of the OCR server 104.

As illustrated in FIG. 2A, the image processing apparatus 101 includes a central processing unit (CPU) 201, a read-only memory (ROM) 202, a random access memory (RAM) 204, a printer device 205, a scanner device 206, a document conveyance device 207, a storage 208, an input device 209, a display device 210, and an external interface 211. The devices and units of the image processing apparatus 101 are interconnected by a data bus 203 in such a way as to be able to communicate with each other.

The CPU 201 is a controller configured to comprehensively control the image processing apparatus 101. The CPU 201 activates an operating system (OS) by a boot program stored in the ROM 202. A controller program stored in the storage 208 is executed on the OS. The controller program is a program for controlling the image processing apparatus 101. The CPU 201 comprehensively controls the devices and units interconnected by the data bus 203. The RAM 204 operates as a temporary storage region, such as a main memory or work area, for the CPU 201.

The printer device 205 is a device which prints image data on a sheet of paper (recording material or paper). The printer device 205 can be of any printing type, such as an electrophotographic printing type, which uses a photosensitive drum or a photosensitive belt, or an inkjet printing type, which ejects ink from a minute nozzle array to directly print an image on a sheet of paper. The scanner device 206 performs scanning on a document, such as a paper document, using an optical scanning device, such as a charge-coupled device (CCD) sensor, to obtain electrical signal data and then generates image data by converting the electrical signal data. Moreover, the document conveyance device 207, which is, for example, an automatic document feeder (ADF), conveys documents placed on a document positioning plate of the document conveyance device 207 one by one to the scanner device 206.

The storage 208 is a readable and writable non-volatile memory, such as a hard disk drive (HDD) or a solid state drive (SSD), on which various pieces of data including, for example, the above-mentioned controller program are recorded. The input device 209 is a device configured with, for example, a touch panel or hardware keys. The input device 209 receives an instruction issued by an operation performed by the user. Then, the input device 209 transfers instruction information including a designated position to the CPU 201. The display device 210 is, for example, a liquid crystal display (LCD) or a cathode-ray tube (CRT). The display device 210 displays image data generated by the CPU 201. The CPU 201 determines what operation has been performed by the user from the instruction information received from the input device 209 and the display data displayed on the display device 210. Then, in response to a result of the determination, the CPU 201 controls the image processing apparatus 101 and generates new display data to cause the display device 210 to display the new display data.

The external interface 211 performs transmission and reception of various pieces of data including image data with respect to an external apparatus via a network, such as a local area network (LAN), a telephone line, or short-distance wireless communication using infrared rays. The external interface 211 receives page-description language (PDL) data from an external apparatus such as the learning apparatus 102 or a personal computer (PC)(not illustrated). The CPU 201 interprets PDL data received by the external interface 211 to generate an image. The generated image is printed by the printer device 205 or is stored in the storage 208. Moreover, the external interface 211 receives image data from an external apparatus such as the image processing server 103. The received image data is printed by the printer device 205, is stored in the storage 208, or is transmitted to another external apparatus via the external interface 211.

The learning apparatus 102 illustrated in FIG. 2B includes a CPU 231, a ROM 232, a RAM 234, a storage 235, an input device 236, a display device 237, an external interface 238, and a graphics processing unit (GPU) 239. The devices and units of the learning apparatus 102 are able to mutually transmit and receive data with respect to each other via a data bus 233.

The CPU 231 is a controller configured to control the entire learning apparatus 102. The CPU 231 activates an OS by a boot program stored in the ROM 232, which is a non-volatile memory. The CPU 231 executes a learning data generation program and a learning program stored in the storage 235 on the OS. The CPU 231 generates learning data by executing the learning data generation program. Moreover, the CPU 231 learns a neural network which performs handwritten extraction, by executing the learning program. The CPU 231 controls the devices and units of the learning apparatus 102 via a bus such as the data bus 233.

The RAM 234 operates as a temporary storage region, such as a main memory or work area, for the CPU 231. The storage 235 is a readable and writable non-volatile memory and has the above-mentioned learning data generation program and learning program recorded thereon.

The input device 236 is a device configured with, for example, a mouse and a keyboard. The display device 237 is similar to the display device 210 described with reference to FIG. 2A.

The external interface 238 is similar to the external interface 211 described with reference to FIG. 2A.

The GPU 239 is an image processing processor and performs generation of image data and learning of a neural network in coordination with the CPU 231.

The image processing server 103 illustrated in FIG. 2C includes a CPU 261, a ROM 262, a RAM 264, a storage 265, an input device 266, a display device 267, and an external interface 268. The devices and units of the image processing server 103 are able to mutually transmit and receive data with respect to each other via a data bus 263.

The CPU 261 is a controller configured to control the entire image processing server 103. The CPU 261 activates an OS by a boot program stored in the ROM 262, which is a non-volatile memory. The CPU 261 executes an image processing server program stored in the storage 265 on the OS. The CPU 261 performs handwritten region estimation and handwritten extraction on the processing target image by executing the image processing server program. The CPU 261 controls the devices and units of the image processing server 103 via a bus such as the data bus 263.

The RAM 264 operates as a temporary storage region, such as a main memory or work area, for the CPU 261. The storage 265 is a readable and writable non-volatile memory and has the above-mentioned image processing server program recorded thereon.

The input device 266 is similar to the input device 236 described with reference to FIG. 2B. The display device 267 is similar to the display device 210 described with reference to FIG. 2A.

The external interface 268 is similar to the external interface 211 described with reference to FIG. 2A.

The OCR server 104 illustrated in FIG. 2D includes a CPU 291, a ROM 292, a RAM 294, a storage 295, an input device 296, a display device 297, and an external interface 298. The devices and units of the OCR server 104 are able to mutually transmit and receive data with respect to each other via a data bus 293.

The CPU 291 is a controller configured to control the entire OCR server 104. The CPU 291 activates an OS by a boot program stored in the ROM 292, which is a non-volatile memory. The CPU 291 executes an OCR server program stored in the storage 295 on the OS. The CPU 291, by executing the OCR server program, recognizes and converts handwritten characters of a handwritten extracted image and type-font characters of a type-font image into text data. The CPU 291 controls the devices and units of the OCR server 104 via a bus such as the data bus 293.

The RAM 294 operates as a temporary storage region, such as a main memory or work area, for the CPU 291. The storage 295 is a readable and writable non-volatile memory and has the above-mentioned OCR server program recorded thereon.

The input device 296 is similar to the input device 236 described with reference to FIG. 2B. The display device 297 is similar to the display device 210 described with reference to FIG. 2A.

The external interface 298 is similar to the external interface 211 described with reference to FIG. 2A.

<Operation Screens>

Figure 5A:
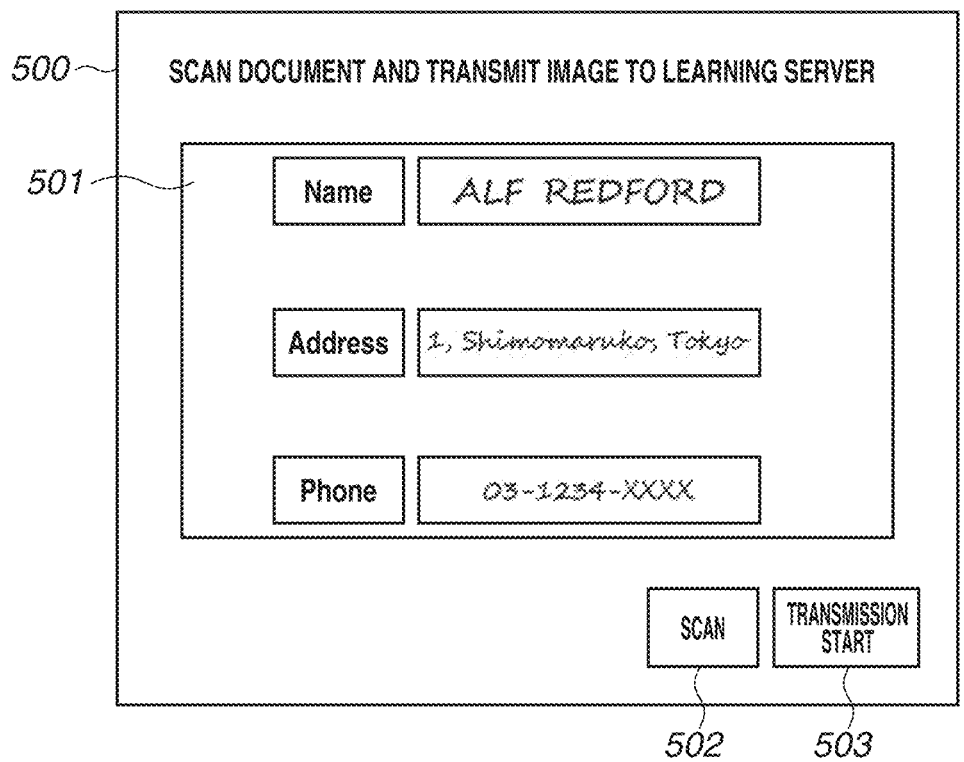
FIG. 5A is a diagram illustrating a learning document scan screen.

A user's instruction in step S301 in the learning sequence illustrated in FIG. 3A is issued via the following operation screen. FIG. 5A is a diagram illustrating a learning document scan screen. The learning document scan screen 500 is an example of a screen which is displayed on the display device 210 of the image processing apparatus 101. As illustrated in FIG. 5A, the learning document scan screen 500 includes a preview region 501, a scan button 502, and a transmission start button 503.

The scan button 502 is a button used to start reading of a document set on the scanner device 206. Upon completion of scanning, a document sample image is generated and is then displayed in the preview region 501. If another document is set on the scanner device 206 and the scan button 502 is pressed again, a plurality of document sample images is collectively stored.

Upon reading of a document, the transmission start button 503 becomes able to be pressed to issue an instruction. In response to the transmission start button 503 being pressed to issue an instruction, the document sample image is transmitted to the learning apparatus 102.

Figure 5B:
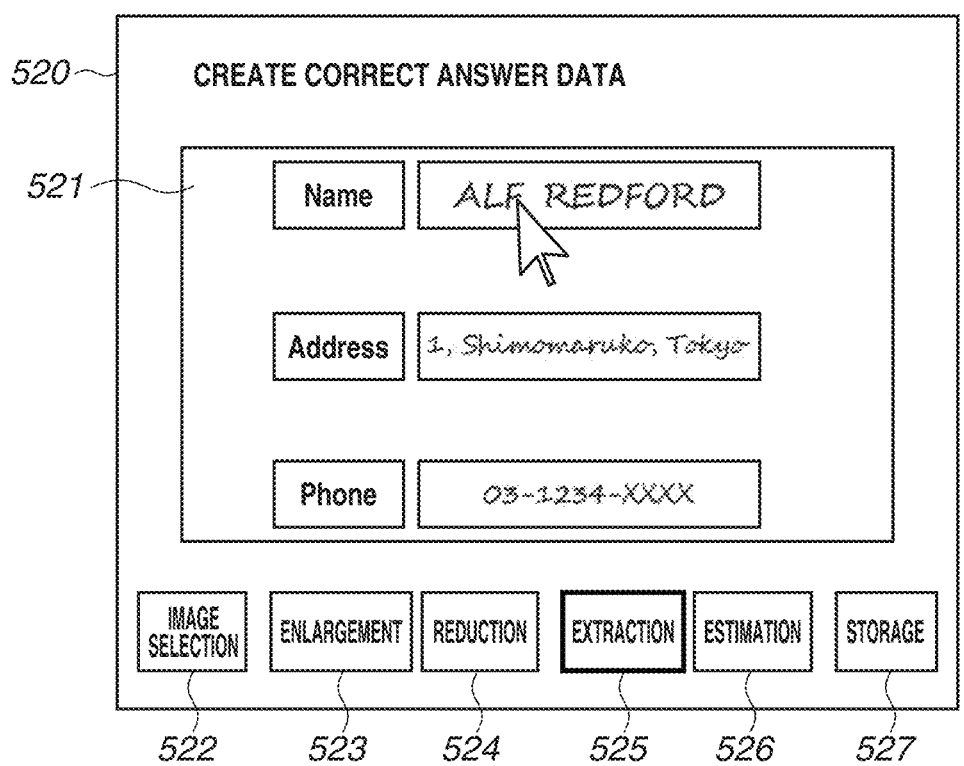
FIG. 5B is a diagram illustrating a handwritten extraction correct answer data creation screen.
Figure 5C:
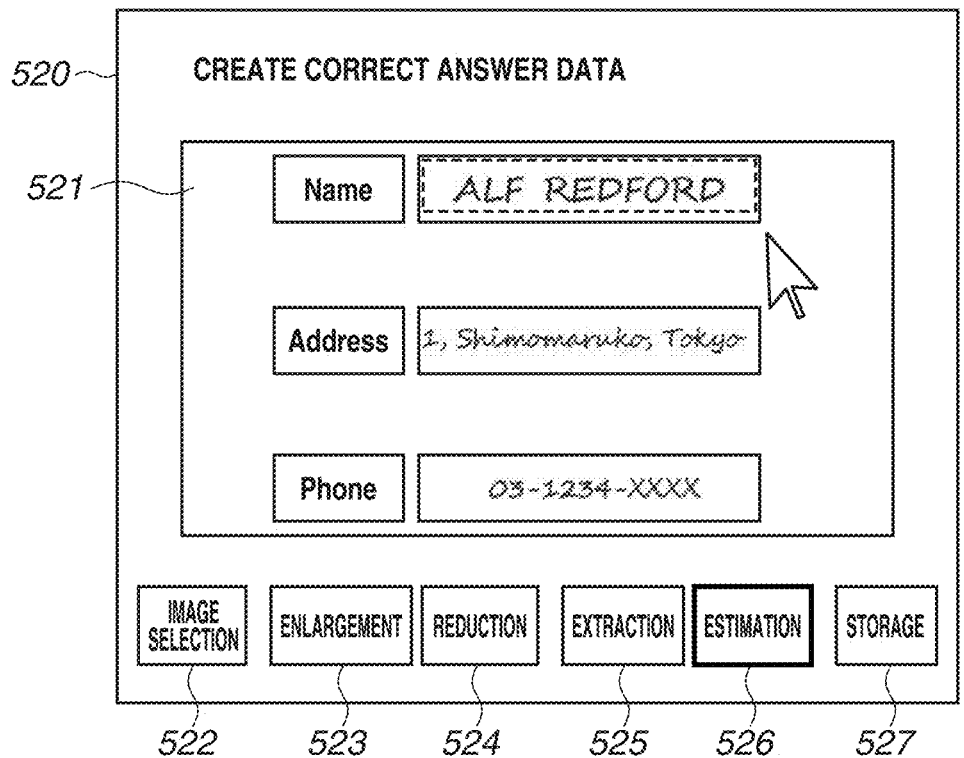
FIG. 5C is a diagram illustrating a handwritten region estimation correct answer data creation screen.

Moreover, a user's instruction in step S305 in the learning sequence illustrated in FIG. 3A is issued via the following operation screen. FIG. 5B is a diagram illustrating a handwritten extraction correct answer data creation screen. FIG. 5C is a diagram illustrating a handwritten region estimation correct answer data creation screen. The user performs an operation based on the display contents of the handwritten extraction correct answer data creation screen and the handwritten region estimation correct answer data creation screen and thus creates correct answer data.

The handwritten extraction correct answer data creation screen 520 is an example of a screen which is displayed on the display device 237 of the learning apparatus 102. Furthermore, the handwritten extraction correct answer data creation screen 520 can be configured to be displayed on a display device of a different apparatus, such as a PC, connected to the learning apparatus 102 via a network and be used to issue an instruction to the learning apparatus 102 via the different apparatus. As illustrated in FIG. 5B, the handwritten extraction correct answer data creation screen 520 includes an image display region 521, an image selection button 522, an enlargement button 523, a reduction button 524, an extraction button 525, an estimation button 526, and a storage button 527.

The image selection button 522 is a button used to select a document sample image received from the image processing apparatus 101 and accumulated in the image accumulation unit 115. In response to the image selection button 522 being pressed to issue an instruction, a selection screen (not illustrated) is displayed to enable selecting a document sample image. In response to a document sample image being selected, the selected document sample image is displayed in the image display region 521. The user performs an operation on the document sample image displayed in the image display region 521 to create correct answer data.

The enlargement button 523 and the reduction button 524 are buttons used to enlarge and reduce a display in the image display region 521, respectively. In response to the enlargement button 523 or the reduction button 524 being pressed to issue an instruction, the document sample image displayed in the image display region 521 is enlarged or reduced to facilitate creation of correct answer data.

The extraction button 525 and the estimation button 526 are buttons used to select which correct answer data for handwritten extraction and handwritten region estimation to create. In response to one of the buttons being selected, the selected button is highlighted. In response to the extraction button 525 being selected, a state for creating correct answer data for handwritten extraction is set. When having selected the extraction button 525, the user creates correct answer data for handwritten extraction by performing the following operation. As illustrated in FIG. 5B, the user operates a mouse cursor via the input device 236 and thus traces and selects handwritten characters in the document sample image displayed in the image display region 521. Upon receiving this operation, the learning data generation unit 112 records pixel positions selected by the user's operation in the document sample image. Thus, correct answer data for handwritten extraction is positions of pixels corresponding to handwritten portions in the document sample image. On the other hand, in response to the estimation button 526 being selected, a state for creating correct answer data for handwritten region estimation is set. When having selected the estimation button 526, the user creates correct answer data for handwritten region estimation by performing the following operation. As indicated with a dashed-line frame illustrated in FIG. 5C, the user operates a mouse cursor via the input device 236. Then, the user selects the inside of a region surrounded by a ruled line and having handwritten characters entered therein included in the document sample image displayed in the image display region 521 (here, the inside of an entry column and not including a ruled line). Thus, this is an operation of selecting a region for each entry column of the business form. Upon receiving this operation, the learning data generation unit 112 records a region selected by the above-mentioned operation. Thus, correct answer data for handwritten region estimation is a region inside the entry column (a region having handwritten characters entered therein) on the document sample image (hereinafter, a region having handwritten characters entered therein being referred to as a "handwritten region").

Figure 4C:
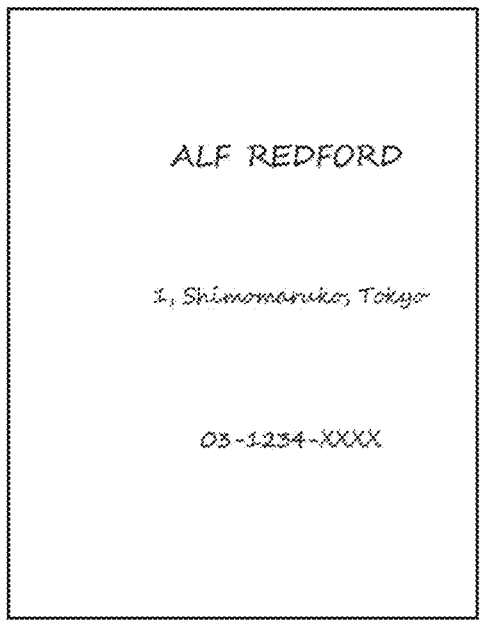
Figure 4D:
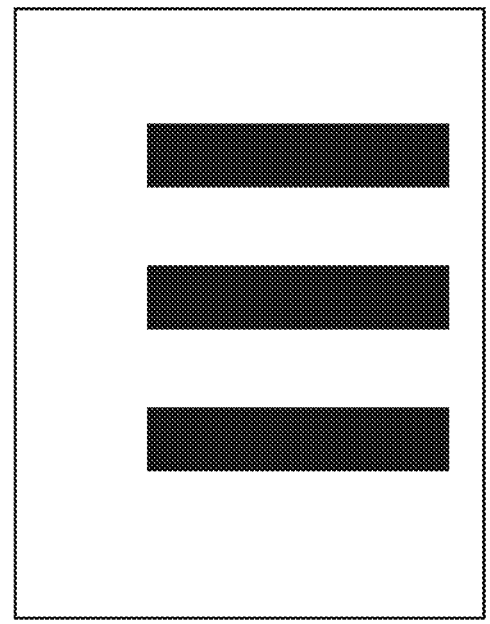

The storage button 527 is a button used to store the created correct answer data. Correct answer data for handwritten extraction is accumulated as the following image in the image accumulation unit 115. The image has the same size (width and height) as the document sample image. The value of each pixel of the handwritten character position selected by the user is a value indicating a handwritten portion (for example, "255" and the same also applying to the following description). Moreover, the value of each pixel of positions other than the handwritten character position is a value indicating not a handwritten portion (for example, "0" and the same also applying to the following description). Hereinafter, such an image as being correct answer data for handwritten extraction is referred to as a "handwritten extraction correct answer image". FIG. 4C illustrates an example of a handwritten extraction correct answer image. Moreover, correct answer data for handwritten region estimation is accumulated as the following image in the image accumulation unit 115. The image has the same size (width and height) as the document sample image. The value of each pixel corresponding to the handwritten region selected by the user is a value indicating a handwritten region (for example, "255" and the same also applying to the following description). Moreover, the value of each pixel corresponding to regions other than the handwritten region is a value indicating not a handwritten region (for example, "0" and the same also applying to the following description). Hereinafter, such an image as being correct answer data for handwritten region estimation is referred to as a "handwritten region estimation correct answer image". FIG. 4D illustrates an example of a handwritten region estimation correct answer image.

Figure 5D:
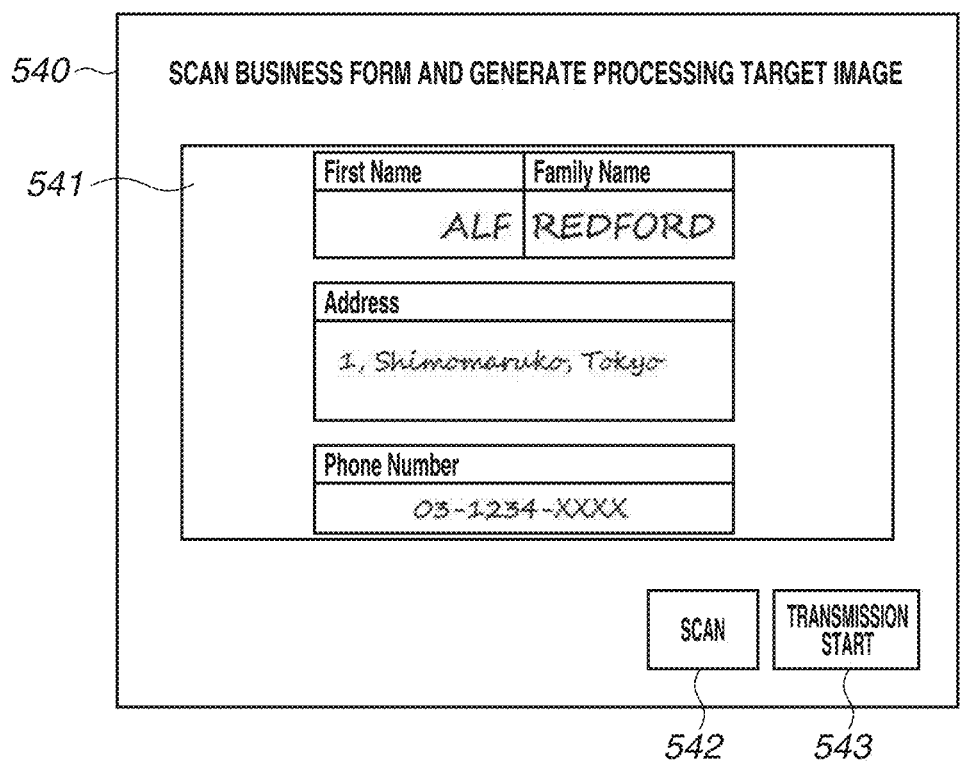
FIG. 5D is a diagram illustrating a business form processing screen.

Moreover, a user's instruction in step S351 in the learning sequence illustrated in FIG. 3B is issued via the following operation screen. FIG. 5D is a diagram illustrating a business form processing screen. As illustrated in FIG. 5D, the business form processing screen 540 includes a preview region 541, a scan button 542, and a transmission start button 543.

The scan button 542 is a button used to start reading of a document set on the scanner device 206. Upon completion of scanning, a processing target image is generated and is then displayed in the preview region 541.

Upon reading of a document, the transmission start button 543 becomes able to be pressed to issue an instruction. In response to the transmission start button 543 being pressed to issue an instruction, the processing target image is transmitted to the image processing server 103.

<Document Sample Image Generation Processing>

Figure 6A:
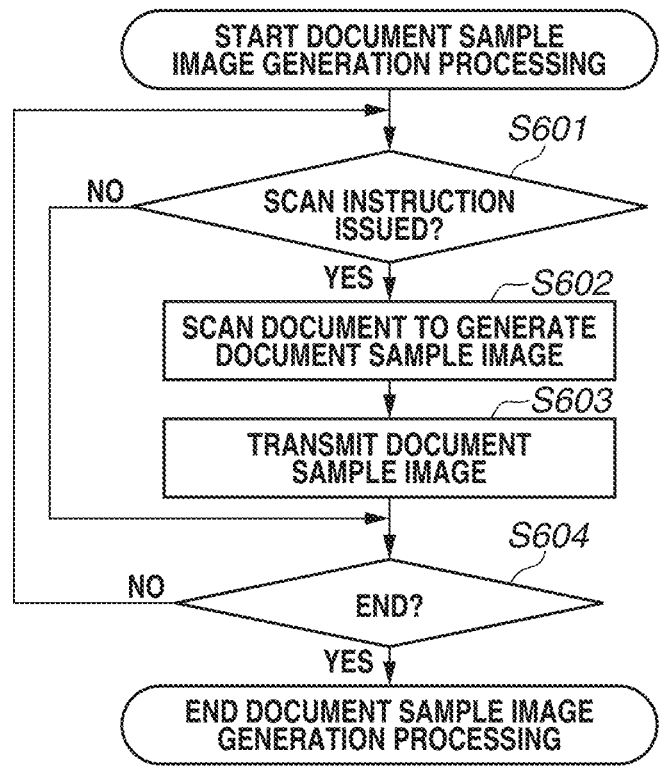
FIG. 6A is a flowchart illustrating the flow of document sample image generation processing.

Next, document sample image generation processing which is performed by the image processing apparatus 101 is described. FIG. 6A is a flowchart illustrating the flow of document sample image generation processing. This processing is implemented by the CPU 201 reading out the controller program stored in the storage 208, loading the controller program onto the RAM 204, and executing the controller program. This processing is started by the user operating the input device 209 of the image processing apparatus 101.

In step S601, the CPU 201 determines whether an instruction for scanning a document has been issued. In a case where the user has performed a predetermined operation to scan a document (pressing the scan button 502 to issue an instruction) via the input device 209, the CPU 201 sets the determination result to "yes" (YES in step S601), and then advances the processing to step S602. If not so, the CPU 201 sets the determination result to "no" (NO in step S601), and then advances the processing to step S604.

In step S602, the CPU 201 controls the scanner device 206 and the document conveyance device 207 to scan a document to generate a document sample image. The document sample image is generated as grayscale image data.

In step S603, the CPU 201 transmits the document sample image generated in step S602 to the learning apparatus 102 via the external interface 211.

In step S604, the CPU 201 determines whether to end the processing. In a case where the user has performed a predetermined operation to end the document sample image generation processing, the CPU 201 sets the determination result to "yes" (YES in step S604), and then ends the processing. If not so, the CPU 201 sets the determination result to "no" (NO in step S604), and then returns the processing to step S601.

With the above-described processing, the image processing apparatus 101 generates a document sample image and transmits the document sample image to the learning apparatus 102. Depending on an operation performed by the user or the number of documents placed on the document conveyance device 207, a plurality of document sample images is acquired.

<Document Sample Image Reception Processing>

Figure 6B:
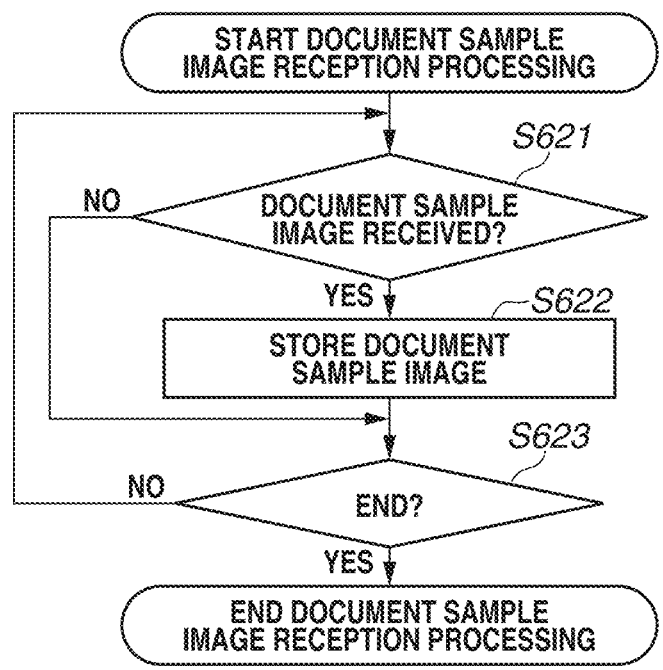
FIG. 6B is a flowchart illustrating the flow of document sample image reception processing.

Next, document sample image reception processing which is performed by the learning apparatus 102 is described. FIG. 6B is a flowchart illustrating the flow of document sample image reception processing. This processing is implemented by the CPU 231 reading out the learning data generation program stored in the storage 235, loading the learning data generation program onto the RAM 234, and executing the learning data generation program. This processing is started by the user powering on the learning apparatus 102.

In step S621, the CPU 231 determines whether the document sample image has been received. If image data has been received via the external interface 238, the CPU 231 sets the determination result to "yes" (YES in step S621), and then advances the processing to step S622. If not so, the CPU 231 sets the determination result to "no" (NO in step S621), and then advances the processing to step S623.

In step S622, the CPU 231 stores the received document sample image in a predetermined region of the storage 235.

In step S623, the CPU 231 determines whether to end the processing. In a case where the user has performed a predetermined operation to end the document sample image reception processing, such as powering off the learning apparatus 102, the CPU 231 sets the determination result to "yes" (YES in step S623), and then ends the processing. If not so, the CPU 231 sets the determination result to "no" (NO in step S623), and then returns the processing to step S621.

<Correct Answer Data Generation Processing>

Next, correct answer data generation processing which is performed by the learning apparatus 102 is described. FIG. 6C is a flowchart illustrating the flow of correct answer data generation processing.

This processing is implemented by the learning data generation unit 112 of the learning apparatus 102. This processing is started by the user performing a predetermined operation via the input device 236 of the learning apparatus 102.

In step S641, the CPU 231 determines whether an instruction to select a document sample image has been issued. In a case where the user has performed a predetermined operation to select a document sample image (pressing the image selection button 522 to issue an instruction) via the input device 236, the CPU 231 sets the determination result to "yes" (YES in step S641), and then advances the processing to step S642. If not so, the CPU 231 sets the determination result to "no" (NO in step S641), and then advances the processing to step S643.

In step S642, the CPU 231 reads out the document sample image selected by the user in step S641 from the storage 235, and outputs the read-out document sample image to the user (displaying in the image display region 521).

In step S643, the CPU 231 determines whether the user has issued an instruction to input correct answer data. If the user has performed an operation of tracing handwritten characters in the document sample image, as mentioned above, or tracing a ruled line frame having handwritten characters entered therein via the input device 236, the CPU 231 sets the determination result to "yes" (YES in step S643), and then advances the processing to step S644. If not so, the CPU 231 sets the determination result to "no" (NO in step S643), and then advances the processing to step S647.

In step S644, the CPU 231 determines whether the correct answer data input by the user is correct answer data for handwritten extraction. If the user has performed an operation of issuing an instruction to create correct answer data for handwritten extraction (selecting the extraction button 525), the CPU 231 sets the determination result to "yes" (YES in step S644), and then advances the processing to step S645. If not so, i.e., in a case where the correct answer data input by the user is correct answer data for handwritten region estimation (selecting the estimation button 526), the CPU 231 sets the determination result to "no" (NO in step S644), and then advances the processing to step S646.

In step S645, the CPU 231 temporarily stores the correct answer data for handwritten extraction input by the user in the RAM 234. As mentioned above, the correct answer data for handwritten extraction is position information about each pixel corresponding to a handwritten portion in the document sample image.

In step S646, the CPU 231 temporarily stores the correct answer data for handwritten region estimation input by the user in the RAM 234. As mentioned above, the correct answer data for handwritten region estimation is region information corresponding to a handwritten region in the document sample image.

In step S647, the CPU 231 determines whether an instruction to store correct answer data has been issued. In a case where the user has performed a predetermined operation to store correct answer data (pressing the storage button 527 to issue an instruction) via the input device 236, the CPU 231 sets the determination result to "yes" (YES in step S647), and then advances the processing to step S648. If not so, the CPU 231 sets the determination result to "no" (NO in step S647), and then advances the processing to step S650.

In step S648, the CPU 231 generates and stores a handwritten extraction correct answer image as correct answer data for handwritten extraction. The CPU 231 generates a handwritten extraction correct answer image by performing the following operation. The CPU 231 generates, as a handwritten extraction correct answer image, an image having the same size as that of the document sample image read out in step S642. The CPU 231 sets all of the pixels of the generated image to a value indicating not a handwritten portion. Then, the CPU 231 refers to the position information temporarily stored in the RAM 234 in step S645, and changes the value of each pixel located in the corresponding position on the handwritten extraction correct answer image to a value indicating a handwritten portion. The CPU 231 stores the handwritten extraction correct answer image generated in this way in a predetermined region of the storage 235 while associating the handwritten extraction correct answer image with the document sample image read out in step S642.

In step S649, the CPU 231 generates and stores a handwritten region estimation correct answer image as correct answer data for handwritten region estimation. The CPU 231 generates a handwritten region estimation correct answer image by performing the following operation. The CPU 231 generates, as a handwritten region estimation correct answer image, an image having the same size as that of the document sample image read out in step S642. The CPU 231 sets all of the pixels of the generated image to a value indicating not a handwritten region. Then, the CPU 231 refers to the region information temporarily stored in the RAM 234 in step S646, and changes the value of each pixel included in the corresponding region on the handwritten region estimation correct answer image to a value indicating a handwritten region. The CPU 231 stores the handwritten region estimation correct answer image generated in this way in a predetermined region of the storage 235 while associating the handwritten region estimation correct answer image with the document sample image read out in step S642 and the handwritten extraction correct answer image generated in step S648.

In step S650, the CPU 231 determines whether to end the processing. In a case where the user has performed a predetermined operation to end the correct answer data generation processing, the CPU 231 sets the determination result to "yes" (YES in step S650), and then ends the processing. If not so, the CPU 231 sets the determination result to "no" (NO in step S650), and then returns the processing to step S641.

<Learning Data Generation Processing>

Figure 7A:
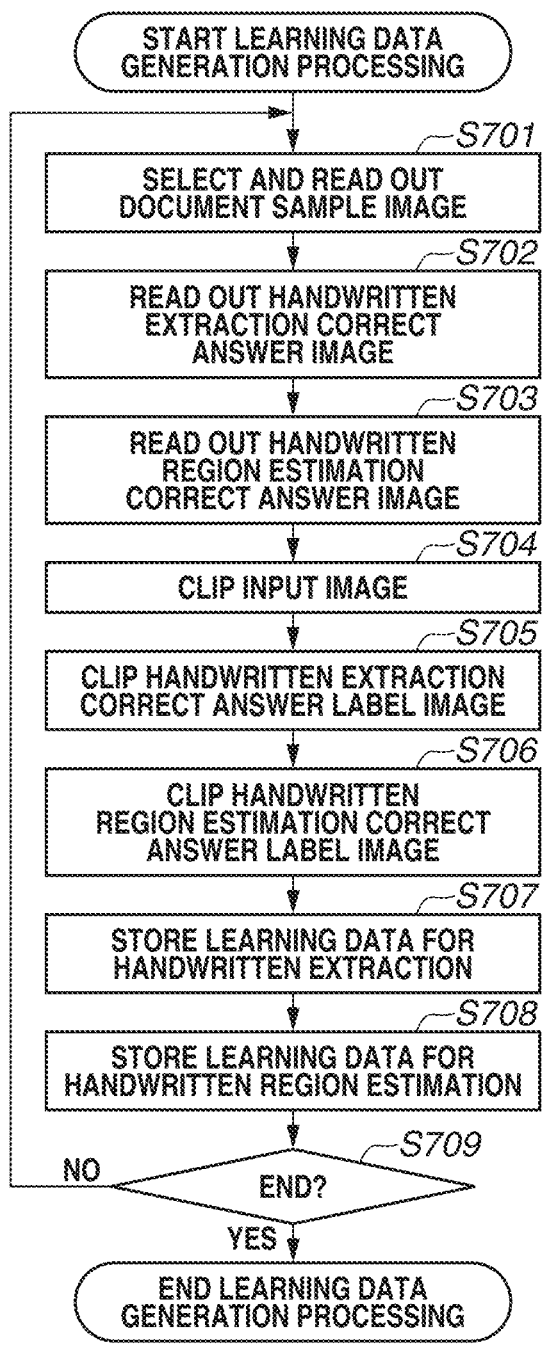
FIG. 7A is a flowchart illustrating the flow of learning data generation processing.

Next, learning data generation processing which is performed by the learning apparatus 102 is described. FIG. 7A is a flowchart illustrating the flow of learning data generation processing. This processing is implemented by the learning data generation unit 112 of the learning apparatus 102. This processing is started by the user performing a predetermined operation via the input device 236 of the learning apparatus 102.

First, in step S701, the CPU 231 selects and reads out a document sample image stored in the storage 235. Since a plurality of document sample images is recorded on the storage 235 by the processing in step S622 illustrated in FIG. 6B, the CPU 231 randomly selects one document sample image from the plurality of document sample images.

In step S702, the CPU 231 reads out a handwritten extraction correct answer image stored in the storage 235. Since a handwritten extraction correct answer image associated with the document sample image read out in step S701 is stored in the storage 235 by the processing in step S648, the CPU 231 reads out the stored handwritten extraction correct answer image.

In step S703, the CPU 231 reads out a handwritten region estimation correct answer image stored in the storage 235. Since a handwritten region estimation correct answer image associated with the document sample image read out in step S701 is stored in the storage 235 by the processing in step S649, the CPU 231 reads out the stored handwritten region estimation correct answer image.

In step S704, the CPU 231 clips a part (for example, a size of 256 pixels in height by 256 pixels in width) of the document sample image read out in step S701 to generate an input image for use in learning data. The CPU 231 determines a clipping position in a random manner.

In step S705, the CPU 231 clips a part of the handwritten extraction correct answer image read out in step S702 to generate a correct answer label image (training data or correct answer image data) for use in learning data for handwritten extraction. Hereinafter, the correct answer label image is referred to as a "handwritten extraction correct answer label image". The clipping position and size are assumed to be similar to the clipping position and size of an input image clipped from the document sample image in step S704.

In step S706, the CPU 231 clips a part of the handwritten region estimation correct answer image read out in step S703 to generate a correct answer label image for use in learning data for handwritten region estimation (hereinafter, the correct answer label image being referred to as a "handwritten region estimation correct answer label image"). The clipping position and size are assumed to be similar to the clipping position and size of an input image clipped from the document sample image in step S704.

In step S707, the CPU 231 associates the input image generated in step S704 and the handwritten extraction correct answer label image generated in step S705 with each other and stores the associated images as learning data for handwritten extraction in a predetermined region of the storage 235. In the first exemplary embodiment, the CPU 231 stores learning data such as that illustrated in FIG. 8A.

In step S708, the CPU 231 associates the input image generated in step S704 and the handwritten region estimation correct answer label image generated in step S706 with each other and stores the associated images as learning data for handwritten region estimation in a predetermined region of the storage 235. In the first exemplary embodiment, the CPU 231 stores learning data such as that illustrated in FIG. 8B. Furthermore, the handwritten region estimation correct answer label image being associated with the input image generated in step S704 results in being also associated with the handwritten extraction correct answer label image generated in step S705.

In step S709, the CPU 231 determines whether to end the learning data generation processing. If a predetermined number of pieces of learning data (the predetermined number being determined by, for example, the user making a designation via the input device 236 of the learning apparatus 102 at the start of the present flowchart) have been generated up to now, the CPU 231 sets the determination result to "yes" (YES in step S709), and then ends the processing. If not so, the CPU 231 sets the determination result to "no" (NO in step S709), and then returns the processing to step S701.

With the above-described processing, learning data for the neural network 1100 is generated. To increase the general versatility of a neural network, modification of learning data can be performed. For example, the input image is magnified or demagnified at a magnification ratio which is determined by being randomly selected from a predetermined range (for example, between 50% to 150%). The handwritten region estimation correct answer label image and the handwritten extraction correct answer label image are also magnified or demagnified in a similar way. Alternatively, the input image is rotated at a rotational angle which is determined by being randomly selected from a predetermined range (for example, between −10 degrees to 10 degrees). The handwritten region estimation correct answer label image and the handwritten extraction correct answer label image are also rotated in a similar way. If variation of magnification or rotation is taken into account, when clipping the input image, the handwritten region estimation correct answer label image, and the handwritten extraction correct answer label image in steps S704, S705, and S706, the CPU 231 performs clipping with a little larger size (for example, a size of 512 pixels in height by 512 pixels in width). Then, after performing variation of magnification or rotation, the CPU 231 performs clipping from a center section in such a way as to attain a final size (for example, 256 pixels in height by 256 pixels in width) of each of the input image, the handwritten region estimation correct answer label image, and the handwritten extraction correct answer label image. Alternatively, the luminance of each pixel of the input image can be changed and modified. For example, the CPU 231 changes the luminance of each pixel of the input image with use of gamma correction. The CPU 231 randomly selects and determines a gamma value from a predetermined range (for example, between 0.1 to 10.0).

<Learning Processing>

Figure 7B:
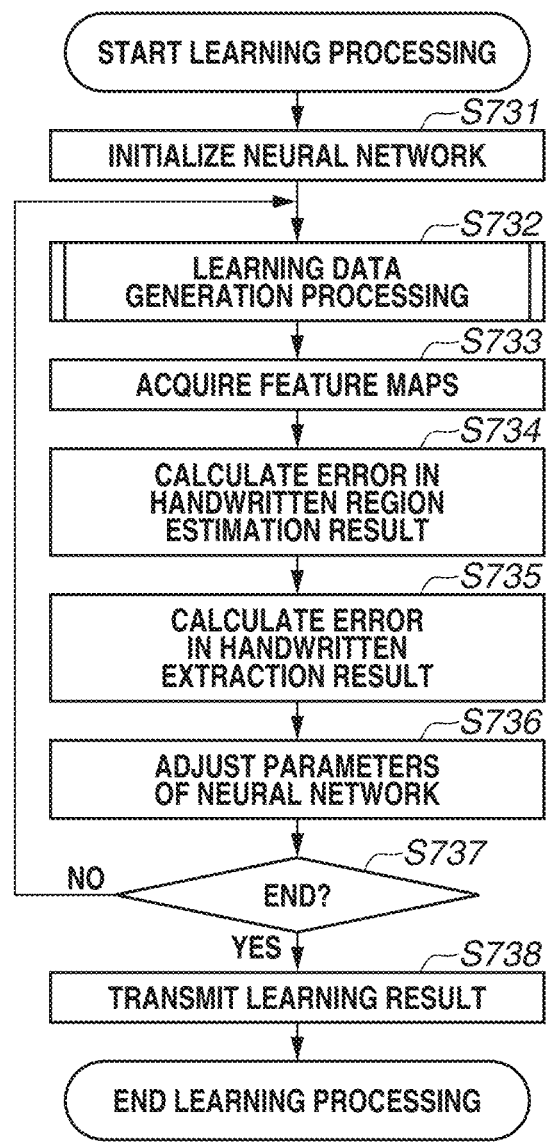
FIG. 7B is a flowchart illustrating the flow of learning processing.

Next, learning processing which is performed by the learning apparatus 102 is described. FIG. 7B is a flowchart illustrating the flow of learning processing. This processing is implemented by the learning unit 113 of the learning apparatus 102. This processing is started by the user performing a predetermined operation via the input device 236 of the learning apparatus 102. Furthermore, in the first exemplary embodiment, a mini-batch method is assumed to be used for learning of the neural network 1100.

First, in step S731, the CPU 231 initializes the neural network 1100. Thus, the CPU 231 builds out the neural network 1100 and initializes the neural network 1100 by randomly determining the values of parameters included in the neural network 1100.

In step S732, the CPU 231 acquires learning data. The CPU 231 performs the learning data generation processing illustrated in the flowchart of FIG. 7A to acquire a predetermined number (a mini-batch size, for example, "10") of pieces of learning data.

In step S733, the CPU 231 obtains an output of the encoder unit 1101 of the neural network 1100. Thus, the CPU 231 inputs an input image included in each of learning data for handwritten region estimation and learning data for handwritten extraction to the neural network 1100, and obtains feature maps output from the encoder unit 1101.

In step S734, the CPU 231 calculates an error in a handwritten region estimation result of the neural network 1100. Thus, the CPU 231 inputs the feature maps acquired in step S733 to the region estimation decoder unit 1122, and obtains an output of the region estimation decoder unit 1122. The output is an image having the same image size as that of the input image and configured such that a pixel determined to be included in a handwritten region as an estimation result has a value indicating a handwritten region and a pixel not so determined has a value indicating not a handwritten region. Then, the CPU 231 evaluates a difference between the output and a handwritten region estimation correct answer label image included in the learning data, thus obtaining an error. Cross-entropy can be used as a barometer of the evaluation.

In step S735, the CPU 231 calculates an error in a handwritten extraction result of the neural network 1100. Thus, the CPU 231 inputs the feature maps acquired in step S733 to the pixel extraction decoder unit 1112, and obtains an output of the pixel extraction decoder unit 1112. The output is an image having the same image size as that of the input image and configured such that a pixel determined to be a handwritten portion as an estimation result has a value indicating a handwritten portion and a pixel not so determined has a value indicating not a handwritten portion. Then, the CPU 231 evaluates a difference between the output and a handwritten extraction correct answer label image included in the learning data, thus obtaining an error. Cross-entropy can be used as a barometer of the evaluation as with handwritten region estimation.

In step S736, the CPU 231 adjusts parameters of the neural network 1100. Thus, the CPU 231 changes the values of parameters of the neural network 1100 by a back propagation method based on the errors calculated in steps S734 and S735.

In step S737, the CPU 231 determines whether to end the learning processing. The CPU 231 performs this determination in the following way. The CPU 231 determines whether processing in steps S732 to S736 has been performed a predetermined number of times (for example, 60,000 times). The predetermined number of times can be determined by, for example, the user performing an operation input at the start of the present flowchart. If the processing has been performed a predetermined number of times, the CPU 231 sets the determination result to "yes" (YES in step S737), and then advances the processing to step S738. If not so, the CPU 231 sets the determination result to "no" (NO in step S737), and then returns the processing to step S732, thus continuing learning of the neural network 1100.

In step S738, the CPU 231 transmits, as a learning result, the parameters of the neural network 1100 adjusted in step S736 to the image processing server 103.

<Business Form Conversion-to-Text Request Processing>

Figure 9A:
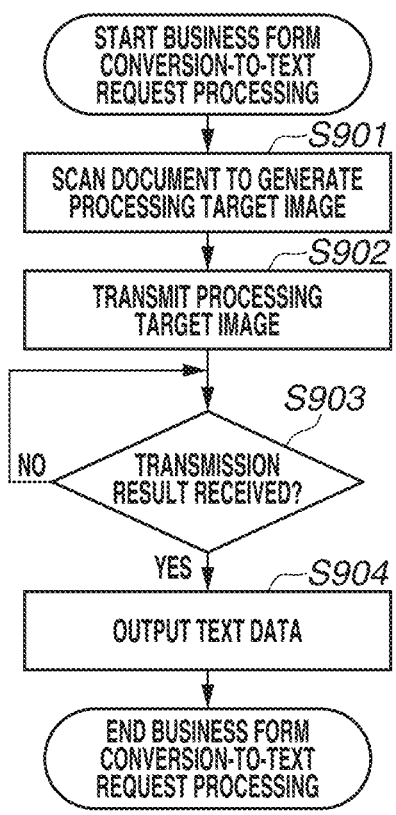
FIG. 9A is a flowchart illustrating the flow of business form conversion-to-text request processing.

Next, business form conversion-to-text request processing which is performed by the image processing apparatus 101 is described. The image processing apparatus 101 scans a business form with handwritten characters entered therein to generate a processing target image. Then, the image processing apparatus 101 transmits the processing target image to the image processing server 103 and requests the image processing server 103 to perform business form conversion-to-text processing. FIG. 9A is a flowchart illustrating the flow of business form conversion-to-text request processing. This processing is implemented by the CPU 201 of the image processing apparatus 101 reading out a controller program stored in the storage 208, loading the controller program onto the RAM 204, and executing the controller program. This processing is started by the user performing a predetermined operation via the input device 209 of the image processing apparatus 101.

First, in step S901, the CPU 201 causes the scanner device 206 and the document conveyance device 207 to scan a document to generate a processing target image. The processing target image is generated as grayscale image data.

In step S902, the CPU 201 transmits the processing target image generated in step S901 to the image processing server 103 via the external interface 211.

In step S903, the CPU 201 determines whether a processing result has been received from the image processing server 103. If a processing result has been received from the image processing server 103 via the external interface 211, the CPU 201 sets the determination result to "yes" (YES in step S903), and then advances the processing to step S904. If not so, the CPU 201 sets the determination result to "no" (NO in step S903), and then repeats processing in step S903.

In step S904, the CPU 201 outputs the processing result received from the image processing server 103, i.e., business form text data generated by recognizing handwritten characters or type-font characters included in the processing target image generated in step S901. For example, the CPU 201 can transmit, via the external interface 211, the business form text data to a transmission destination set by the user operating the input device 209.

<Business Form Conversion-to-Text Processing>

Figure 9B:
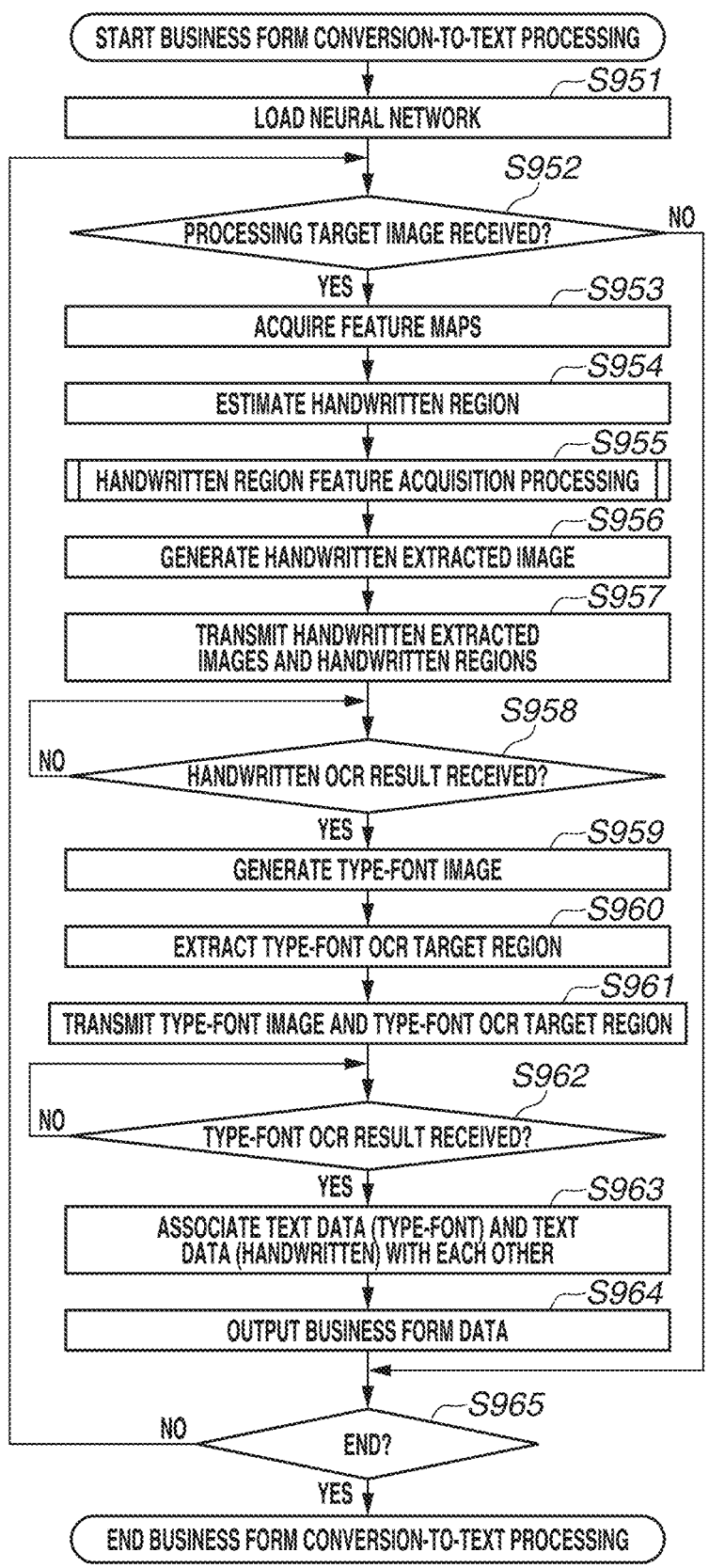
FIG. 9B is a flowchart illustrating the flow of business form conversion-to-text processing.
Figure 10B:
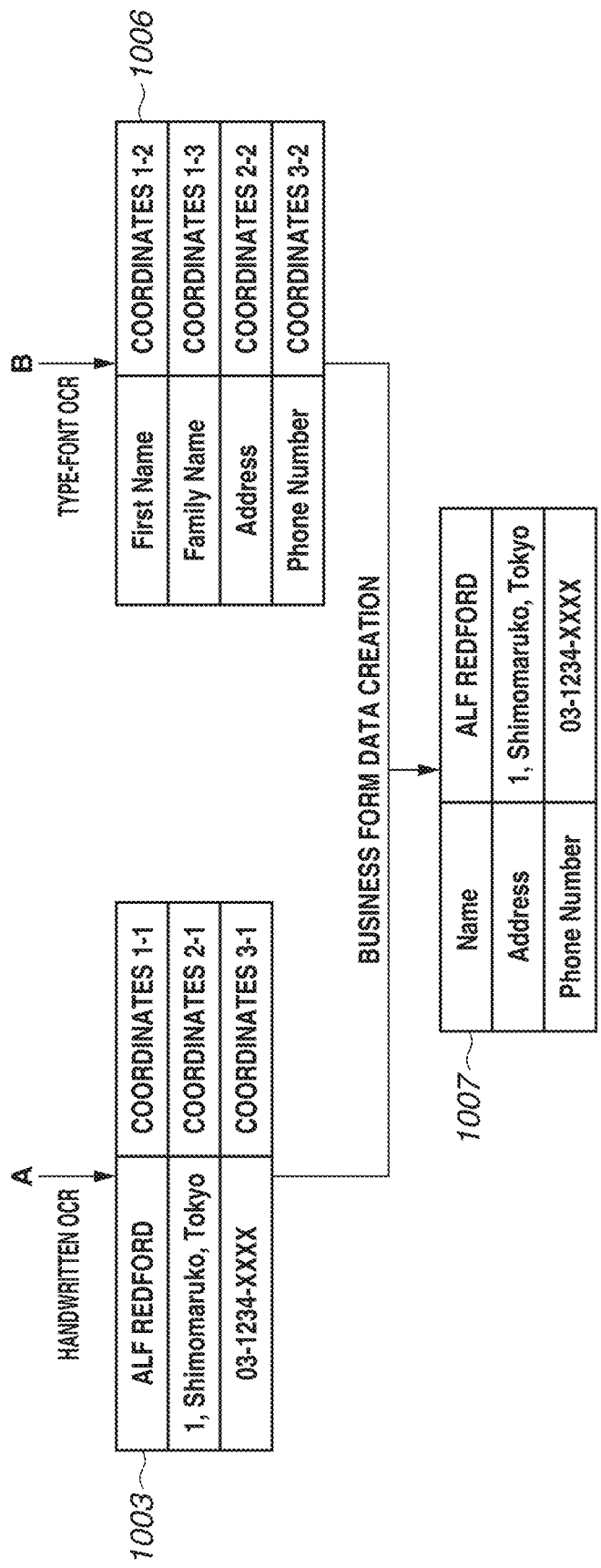

Next, business form conversion-to-text processing which is performed by the image processing server 103 is described. FIG. 9B is a flowchart illustrating the flow of business form conversion-to-text processing. FIGS. 10A and 10B are diagrams illustrating an outline of data generation processing in the business form conversion-to-text processing. The image processing server 103, which functions as the image conversion unit 114, receives the processing target image from the image processing apparatus 101, and obtains text data by performing OCR on type-font characters and handwritten characters included in the scanned image data. The image processing server 103 causes the type-font OCR unit 117 to perform OCR on type-font characters. The image processing server 103 causes the handwritten OCR unit 116 to perform OCR on handwritten characters. The business form conversion-to-text processing is implemented by the CPU 261 reading out an image processing server program stored in the storage 265, loading the image processing server program onto the RAM 264, and executing the image processing server program. This processing is started by the user powering on the image processing server 103.

First, in step S951, the CPU 261 loads the neural network 1100 illustrated in FIG. 11, which performs handwritten region estimation and handwritten extraction. The CPU 261 builds out the same neural network 1100 as that used in step S731 illustrated in the flowchart of FIG. 7B. Then, the CPU 261 reflects, in the built-out neural network 1100, the learning result (parameters of the neural network 1100) transmitted from the learning apparatus 102 in step S738.

In step S952, the CPU 261 determines whether the processing target image has been received from the image processing apparatus 101. If the processing target image has been received via the external interface 268, the CPU 261 sets the determination result to "yes" (YES in step S952), and then advances the processing to step S953. If not so, the CPU 261 sets the determination result to "no" (NO in step S952), and then advances the processing to step S965. Here, a business form 400 illustrated in FIG. 10A (business form 400 illustrated in FIG. 4A) is assumed to have been received as the processing target image.

After performing step S952, then in steps S953 to S958, the CPU 261 inputs the processing target image received from the image processing apparatus 101 to the neural network 1100 and performs handwritten region estimation and handwritten extraction. The neural network 1100 has a configuration in which, as described above with reference to FIG. 11, the pixel extraction decoder unit 1112 and the region estimation decoder unit 1122 share a calculation result obtained by the encoder unit 1101, i.e., the extracted feature maps. A handwritten pixel exists within a handwritten region. Taking advantage of this, the CPU 261 narrows the feature maps output from the pixel extraction decoder unit 1112 down to a region corresponding to the handwritten region estimated by the region estimation decoder unit 1122. Then, the CPU 261 inputs feature maps included in the narrowed region to the pixel extraction decoder unit 1112. This enables reducing a calculation amount required for performing handwritten extraction in a non-handwritten region, which is a region in which no handwritten pixel exists.

In step S953, the CPU 261 inputs the processing target image received from the image processing apparatus 101 to the neural network 1100 built out in step S951 and obtains feature maps output from the encoder unit 1101.

In step S954, the CPU 261 estimates a handwritten region from the processing target image received from the image processing apparatus 101. Thus, the CPU 261 inputs the feature maps acquired in step S953 to the region estimation decoder unit 1122 to estimate a handwritten region. The CPU 261 obtains the following image data as an output of the neural network 1100. Thus, the CPU 261 obtains image data having the same image size as that of the processing target image and configured such that a value indicating a handwritten region is recorded on a pixel determined to be included in a handwritten region as an estimation result and a value indicating not a handwritten region is recorded on a pixel determined not to be included in a handwritten region. Furthermore, as mentioned above, in step S305 illustrated in FIG. 3A, the user has created correct answer data for handwritten region estimation in a position corresponding to an entry column associated with each entry item of the business form. Accordingly, the region estimation decoder unit 1122 of the neural network 1100 has previously learned this and, therefore, outputs a pixel having a value indicating a handwritten region for each entry column. Furthermore, since the output of the neural network 1100 is an estimation result for each pixel and an estimated region is not necessarily an accurate rectangle and is, therefore, difficult to treat, the CPU 261 sets a circumscribed rectangle including the estimated region. Setting of the circumscribed rectangle can be implemented by applying a known technique thereto. Each circumscribed rectangle can be expressed as region coordinate information composed of the upper left end point, width, and height on the processing target image. The CPU 261 sets a rectangle information group obtained in this way as a handwritten region. A dotted frame 1002 illustrated in FIG. 10A represents an example of a handwritten region estimated with respect to the processing target image (business form 400).

In step S955, the CPU 261 performs processing for acquiring, based on all of the handwritten regions estimated in step S954, feature maps of a portion corresponding to each handwritten region in the feature maps output from the convolutional layers EC1, EC2, EC3, and EC4 acquired in step S953. Furthermore, in the following description, a feature map (partial feature map) of a region corresponding to a handwritten region on the feature maps output from each convolutional layer is referred to as a "handwritten region feature map".

Figure 12:
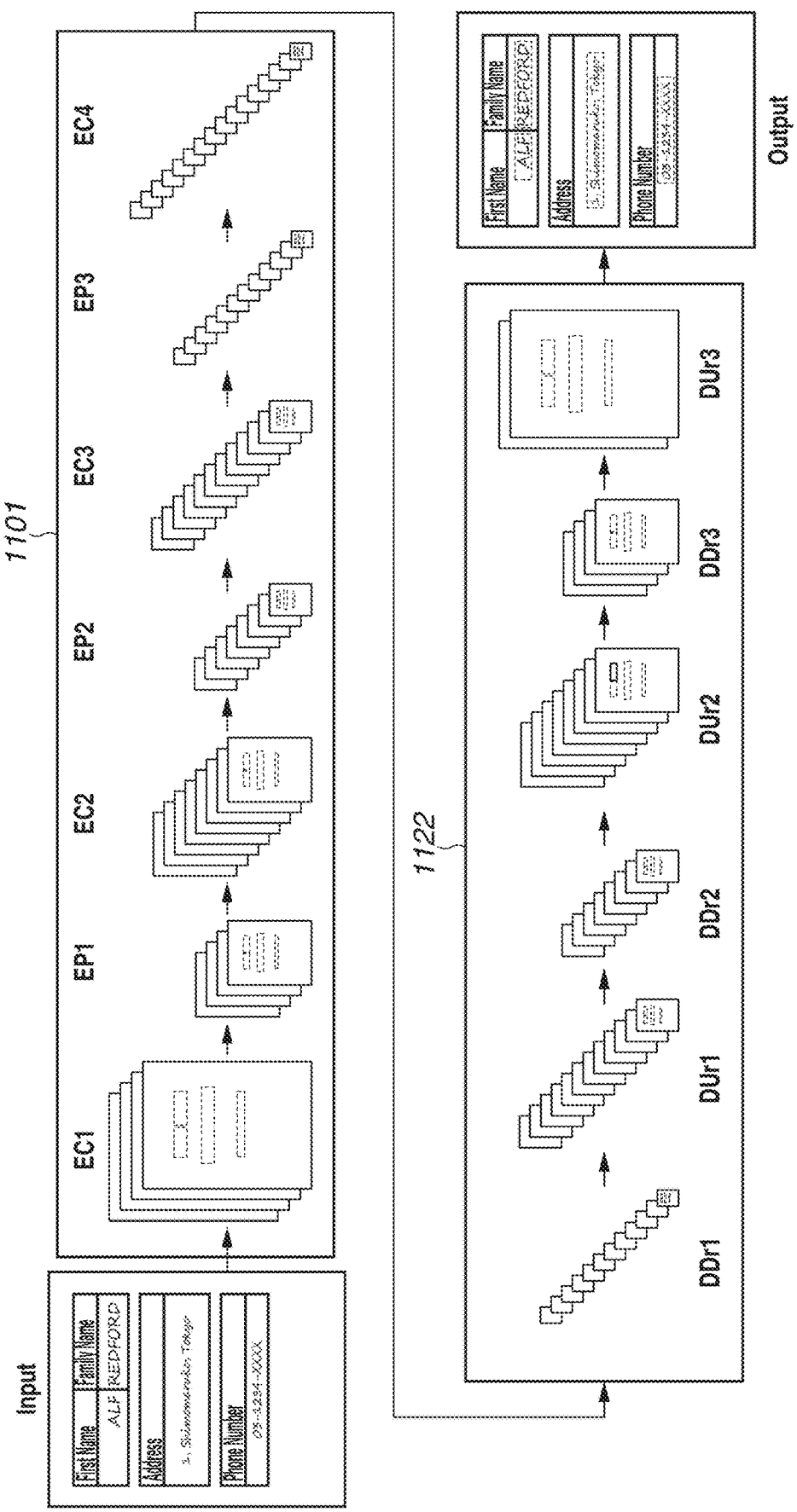
FIG. 12 is a diagram illustrating a relationship between a handwritten region and a feature map.

Here, a relationship between an estimation result of a handwritten region with respect to an image input to the neural network 1100 and feature maps output from the convolutional layers EC1, EC2, EC3, and EC4 is described. FIG. 12 is a diagram used to explain a relationship between an estimation result of a handwritten region with respect to an image input to the neural network 1100 and feature maps output from the convolutional layers EC1, EC2, EC3, and EC4. Upon receiving an input image, the neural network 1100 extracts features at the respective convolutional layers of the encoder unit 1101 to output feature maps, and causes the region estimation decoder unit 1122 to process the feature maps to estimate to which class each pixel of the input image belongs. Referring to FIG. 12, features of dashed-line portions in the feature maps extracted by the respective layers of the encoder unit 1101 are processed by the respective layers of the region estimation decoder unit 1122, and dashed-line regions corresponding to dashed-line portions of feature maps in an output image are output as handwritten regions. Moreover, referring to FIG. 12, feature maps output from the convolutional layers EC1, EC2, and EC3 are reduced in resolution at the respective predetermined magnification ratios through the pooling layers EP1, EP2, and EP3. On the other hand, an output image from the region estimation decoder unit 1122 is made to have the same resolution as that of feature maps output from the convolutional layer EC1 through the upsampling layers DUr1, DUr2, and DUr3.

Figure 13:
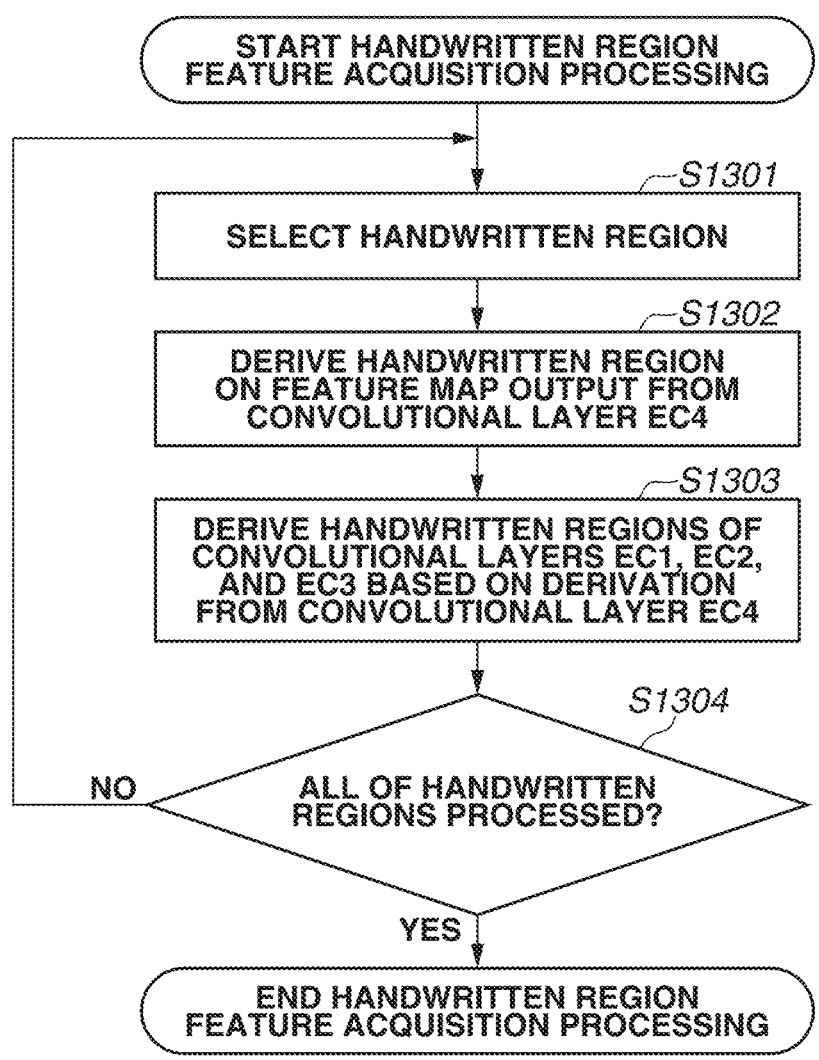
FIG. 13 is a flowchart illustrating the flow of handwritten region feature acquisition processing.

Taking into account the above-described relationship between an estimation result for a handwritten region and feature maps output from the convolutional layers EC1, EC2, EC3, and EC4, handwritten region feature acquisition processing is described. FIG. 13 is a flowchart illustrating the flow of handwritten region feature acquisition processing.

In step S1301, the CPU 261 selects one of handwritten regions estimated in step S954.

In step S1302, the CPU 261 acquires a feature map of a portion corresponding to the handwritten region selected in step S1301 (handwritten region feature map) with respect to the feature maps output from the convolutional layer EC4. Specifically, the CPU 261 calculates a handwritten region feature map to be output from the convolutional layer EC4 (a feature map to be input to the pixel extraction decoder unit 1112), by multiplying region coordinate information about the handwritten region selected in step S1301 by a size ratio between the output of the convolutional layer EC1 and the output of the convolutional layer EC4. Here, the handwritten region selected in step S1301 has been acquired as a circumscribed rectangle including a region obtained by handwritten region estimation. Thus, the handwritten region is a region obtained by separating off non-handwritten regions surrounding the handwritten region. On the other hand, in the case of convolutional processing in the deconvolutional layer DDp1, the CPU 261 can also refer to non-handwritten pixels surrounding the handwritten region. In this case, the CPU 261 circumferentially expands the handwritten region obtained by estimation to a small extent. For example, the CPU 261 circumferentially expands the handwritten region by a width obtained by subtracting "1" from a kernel size (width and height) to be applied to convolutional processing. The CPU 261 can calculate a handwritten region feature map based on the region obtained in this way. Moreover, in the case of convolutional processing, the CPU 261 can also refer to non-handwritten pixels further surrounding the handwritten region. Thus, the CPU 261 can apply, as the handwritten region, a region obtained by expanding the handwritten region by more than a width obtained by subtracting "1" from the kernel size.

After deriving a handwritten region feature map to be output from the convolutional layer EC4, the CPU 261 advances the processing to step S1303.

In step S1303, the CPU 261 also derives handwritten region feature maps to be output from the convolutional layers EC1, EC2, and EC3 to perform skip connection. Here, as illustrated in FIG. 12, as outputs of the respective convolutional layers, feature maps obtained by halving the output resolution of the preceding layer are output by the pooling layers EP1, EP2, and EP3 located between the respective convolutional layers. For this reason, the CPU 261 calculates a handwritten region feature map to be output from the convolutional layer EC3, by doubling coordinate information (vertical position, horizontal position, width, and height) about the handwritten region feature map to be output from the convolutional layer EC4 calculated in step S1302. Moreover, the CPU 261 calculates a handwritten region feature map to be output from the convolutional layer EC2, by quadrupling the coordinate information. Moreover, the CPU 261 calculates a handwritten region feature map to be output from the convolutional layer EC1, by coupling the coordinate information.

In step S1304, the CPU 261 determines whether all of the handwritten regions have been processed. If processing operations in steps S1302 and S1303 have been performed on all of the handwritten regions estimated in step S954, the CPU 261 sets the determination result to "yes" (YES in step S1304), and then ends the handwritten region feature acquisition processing. Then, the CPU 261 returns the processing to the business form conversion-to-text processing illustrated in FIG. 9B and advances the processing to step S956.

If not so, the CPU 261 sets the determination result to "no" (NO in step S1304), and then returns the processing to step S1301, in which the CPU 261 selects and processes a next handwritten region.

In step S956, the CPU 261 inputs, to the pixel extraction decoder unit 1112, all of the handwritten region feature maps output from the convolutional layers EC1, EC2, EC3, and EC4 of the encoder unit 1101 derived in step S955. Then, the CPU 261 causes the pixel extraction decoder unit 1112 to estimate handwritten pixels within the range of all of the handwritten regions on the feature maps output from the respective convolutional layers EC1, EC2, EC3, and EC4. As an output of the neural network 1100, the following image data is obtained. Thus, the obtained image data is image data having the same image size as that of the handwritten region and configured such that a pixel determined to be a handwritten portion as an estimation result has a value indicating that the pixel is a handwritten portion and a pixel determined not to be a handwritten portion has a value indicating that the pixel is not a handwritten portion. Then, the CPU 261 extracts, from the processing target image, pixels located at the same positions as those of pixels having a value indicating that the pixel is a handwritten portion included in the obtained image data, thus generating a handwritten extracted image. This results in obtaining a handwritten extracted image 1001 illustrated in FIG. 10A. As illustrated in FIG. 10A, the handwritten extracted image 1001 is an image in which only handwritten pixels in the handwritten region are included. Handwritten extracted images the number of which corresponds to the number of handwritten region feature maps input to the pixel extraction decoder unit 1112 are output.

In step S957, the CPU 261 transmits all of the handwritten extracted images generated in step S956 to the handwritten OCR unit 116 via the external interface 268. Then, the CPU 261 causes the handwritten OCR unit 116 to perform handwritten OCR on all of the handwritten extracted images. Handwritten OCR can be implemented by applying a known technique thereto. Performing handwritten OCR on a handwritten extracted image prevents or reduces, for example, printed contents, such as type-font characters or marks, in a handwritten entry column from being targeted for handwritten OCR, as in the address entry column 403 or the phone number entry column 404 illustrated in FIG. 4A. Moreover, estimating adjacent items, such as the first name entry column 401 and the family name entry column 402, to be separate handwritten regions to perform handwritten OCR thereon prevents or reduces characters or items from being connected to each other.

In step S958, the CPU 261 determines whether all of the handwritten OCR results have been received from the handwritten OCR unit 116. The handwritten OCR result is text data obtained by the handwritten OCR unit 116 recognizing handwritten characters included in the handwritten region. If all of the handwritten OCR results have been received from the handwritten OCR unit 116 via the external interface 268, the CPU 261 sets the determination result to "yes" (YES in step S958), and then advances the processing to step S959. If not so, the CPU 261 sets the determination result to "no" (NO in step S958), and then repeats processing in step S958. With the processing performed so far, the CPU 261 has obtained a handwritten region (coordinate information) and text data obtained by recognizing handwritten characters included in the handwritten region. The CPU 261 stores the obtained handwritten region and text data as a handwritten information table 1003 in the RAM 264.

In step S959, the CPU 261 generates a type-font image by removing handwritten portions from the processing target image based on coordinate information about the handwritten region generated in step S954 and all of the handwritten extracted images generated in step S956. The CPU 261 changes pixels included in the processing target image and located at the same positions as those of pixels having a value indicating that the pixel is a handwritten portion in all of the handwritten extracted images generated in step S956 to white (red, green, blue (RGB)=(255, 255, 255)). This results in obtaining a type-font image 1004 illustrated in FIG. 10A.

In step S960, the CPU 261 extracts a type-font region from the type-font image generated in step S959. The CPU 261 extracts, as a type-font region, a partial region on the type-font image including type-font characters. Here, the partial region is a gathering (object) of printed contents and is, for example, a character row composed of a plurality of characters, a sentence composed of a plurality of character rows, or an object such as a figure, photograph, table, or graph. As a method of extracting the partial region, for example, the following method can be employed. The method binarizes a type-font image into black and white to generate a binary image. In the binary image, the method extracts a portion in which black pixels are connected to each other (connected black pixels), and creates a rectangle circumscribing the connected black pixels. The method evaluates the shape and size of the rectangle to obtain a rectangle group for character or part of character. With respect to the rectangle group, the method evaluates a distance between rectangles and integrates rectangles the distance between which is less than or equal to a predetermined threshold value, thus obtaining a rectangle group for character. In a case where rectangles for character having similar sizes are present side by side in a close manner, the method integrates the rectangles to obtain a rectangle group for character row. In a case where rectangles for character row having similar shorter side lengths are present side by side at regular intervals, the method integrates the rectangles to obtain a rectangle group for sentence. Moreover, the method also obtains a rectangle including an object other than characters, rows, and sentences, such as a figure, photograph, table, or graph. The method eliminates an isolated rectangle for character or part of character from the rectangles extracted in the above-mentioned way. The method sets the remaining rectangles as a partial region. Each type-font region 1005 extracted with respect to the type-font image is illustrated with a dashed-line frame in FIG. 10A. The present processing step is able to extract a plurality of background partial regions from a background sample image.

In step S961, the CPU 261 transmits the type-font image generated in step S959 and the type-font region acquired in step S960 to the type-font OCR unit 117 via the external interface 268, and causes the type-font OCR unit 117 to perform type-font OCR. The type-font OCR can be implemented by applying a known technique thereto.

In step S962, the CPU 261 determines whether a type-font OCR result has been received from the type-font OCR unit 117. The type-font OCR result is text data obtained by the type-font OCR unit 117 recognizing type-font characters included in the type-font region. If a type-font OCR result has been received from the type-font OCR unit 117 via the external interface 268, the CPU 261 sets the determination result to "yes" (YES in step S962), and then advances the processing to step S963. If not so, the CPU 261 sets the determination result to "no" (NO in step S962), and then repeats processing in step S962. With the processing performed so far, the CPU 261 has obtained a type-font region (coordinate information) and text data obtained by recognizing type-font characters included in the type-font region. The CPU 261 stores the obtained type-font region and text data as a type-font information table 1006 in the RAM 264.

In step S963, the CPU 261 integrates the handwritten OCR result and the type-font OCR result respectively received from the handwritten OCR unit 116 and the type-font OCR unit 117. The CPU 261 evaluates the original positional relationship between the handwritten region and the type-font region and a semantic relationship between pieces of text data, which are the handwritten OCR result and the type-font OCR result, and thus estimates an association between the handwritten OCR result and the type-font OCR result. The CPU 261 performs this estimation based on the handwritten information table 1003 and the type-font information table 1006. Then, the CPU 261 identifies a handwritten region included in the first name entry column 401 as a handwritten region closest in distance to a type-font region included in the first name heading 411. The CPU 261 can take into account not only the distance but also a positional relationship between the handwritten region and the type-font region, such as vertical and horizontal relationships. Additionally, if text data which is a handwritten OCR result of the handwritten region is a character string including the family name in a full name, the CPU 261 is able to identify the text data as the family name in a full name. Therefore, the CPU 261 evaluates the type-font OCR result and the handwritten OCR result as a relationship between a pair including an item and a value about the family name in a full name. Similarly, with regard to the first name in a full name, taking into account a distance between the type-font region and the handwritten region and the handwritten OCR result being a character string including the first name in a full name, the CPU 261 evaluates the type-font OCR result and the handwritten OCR result as a relationship between a pair including an item and a value about the first name in a full name. The CPU 261 can integrate the family name and the first name into a pair including an item and a value about the full name. Additionally, similarly, with regard to the address, taking into account a distance between the type-font region and the handwritten region and the handwritten OCR result being a character string including the geographical name, the CPU 261 evaluates a relationship between the type-font OCR result and the handwritten OCR result. With regard to the phone number, taking into account a distance between the type-font region and the handwritten region and the handwritten OCR result being composed of numerals, the CPU 261 evaluates a relationship between the type-font OCR result and the handwritten OCR result. In this way, the CPU 261 integrates the handwritten OCR result and the type-font OCR result into one or more pairs each including an item and a value and thus generates business form text data 1007.

In step S964, the CPU 261 transmits the generated business form data to the image acquisition unit 111.

In step S965, the CPU 261 determines whether to end the processing. In a case where the user has performed a predetermined operation to, for example, power off the image processing server 103, the CPU 261 sets the determination result to "yes" (YES in step S965), and then ends the processing. If not so, the CPU 261 sets the determination result to "no" (NO in step S965), and then returns the processing to step S952.

As described above, according to the first exemplary embodiment, the image processing system 100 uses a neural network having a configuration in which an encoder unit (layers performing similar calculations) is shared between a handwritten region estimation neural network and a handwritten extraction neural network. Then, the image processing system 100 estimates a handwritten region from a scanned image of a business form including handwritten characters and thus generates a handwritten extracted image including only a handwritten portion corresponding to the estimated handwritten region. At this time, since handwritten pixels exist within a handwritten region, the image processing system 100 inputs a feature map obtained by narrowing down to only the handwritten region estimated by a decoder unit for handwritten region estimation to a decoder unit for handwritten extraction. This enables reducing the amount of calculation required for performing handwritten extraction in a non-handwritten region, in which no handwritten pixels exist, and thus decreasing the amount of calculation for generation.

Furthermore, while, in the first exemplary embodiment, in the business form conversion-to-text processing, the image processing system 100 performs processing for inputting a feature map obtained by narrowing down to only a handwritten region estimated by a decoder unit for handwritten region estimation to a decoder unit for handwritten extraction, the image processing system 100 can perform similar processing even in the learning processing. In that case, even in the learning processing, the image processing system 100 calculates an error in a neural network for handwritten region estimation in step S734. Next, the image processing system 100 performs the handwritten region feature acquisition processing illustrated in FIG. 13. Next, in step S735, the image processing system 100 inputs a feature map obtained by narrowing down to only a portion corresponding to a handwritten region estimated by the decoder unit for handwritten region estimation to the decoder unit for handwritten extraction.

In a second exemplary embodiment, a method of, when inputting a feature map obtained by narrowing down to only a handwritten region acquired by handwritten region estimation to a decoder unit for handwritten extraction, inputting a feature map obtained by further narrowing down the region is described. In the first exemplary embodiment, for example, an erroneous extraction of a handwritten region or a possible presence of a small region unnecessary for handwritten extraction, which may occur due to, for example, small pen smear caused by an unintended contact of a pen to a form is not taken into account. In the second exemplary embodiment, with respect to such a case, a method of further narrowing down a region for a feature map to be input to the decoder unit for handwritten extraction is described. Furthermore, the configuration of an image processing system 100 according to the second exemplary embodiment is similar to the configuration in the first exemplary embodiment except for characterizing portions. Therefore, similar constituent elements are assigned the respective same reference characters and the detailed description thereof is omitted here.

<Business Form Conversion-to-Text Processing>

Figure 14A:
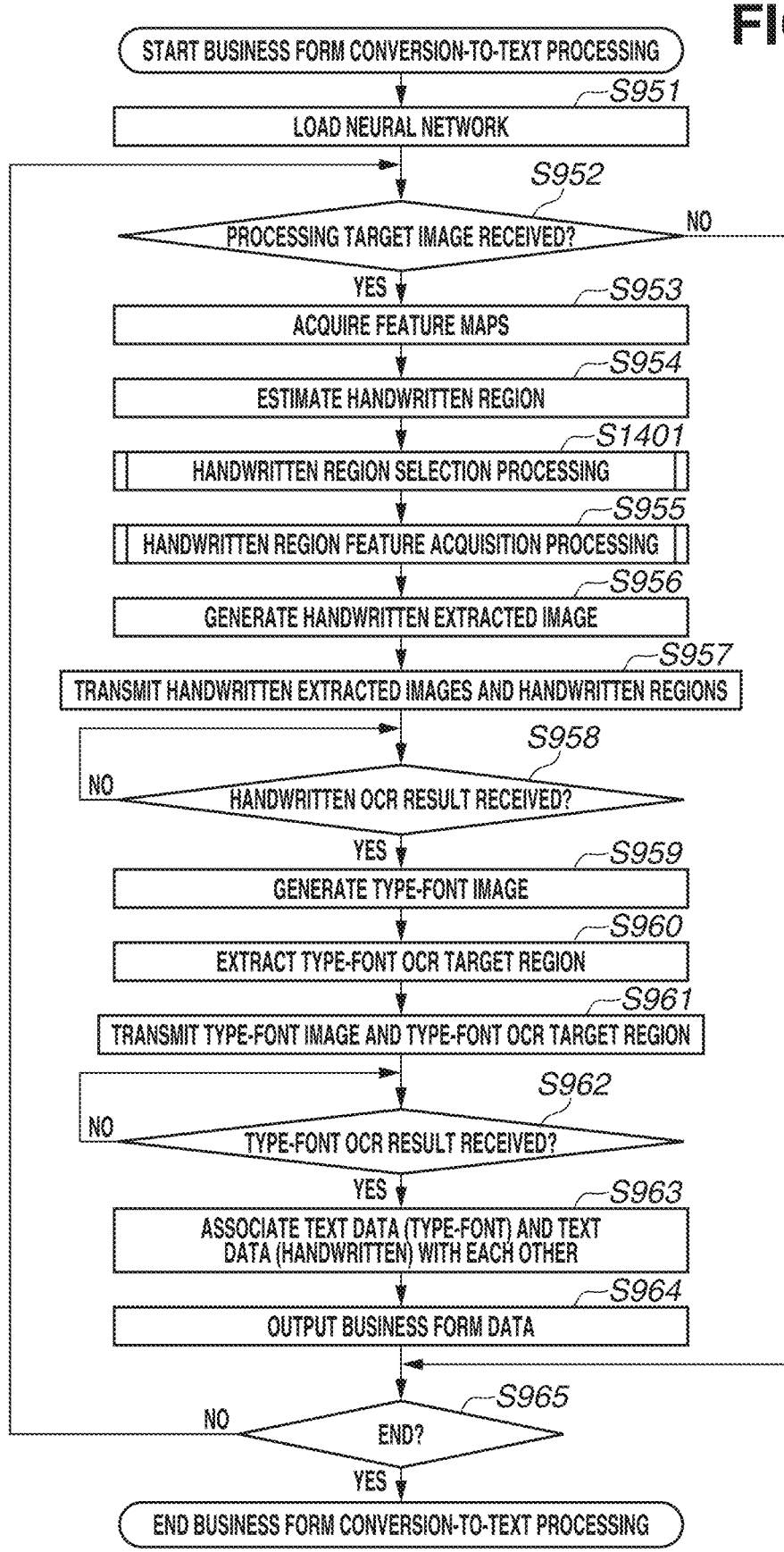
FIG. 14A is a flowchart illustrating the flow of business form conversion-to-text processing in a second exemplary embodiment.

Business form conversion-to-text processing which is performed by the image processing server 103 in the second exemplary embodiment is described. FIG. 14A is a flowchart illustrating the flow of business form conversion-to-text processing in the second exemplary embodiment. This processing is implemented by the CPU 261 reading out an image processing server program stored in the storage 265, loading the image processing server program onto the RAM 264, and executing the image processing server program. This processing is started by the user powering on the image processing server 103.

Processing operations in steps S951 to S954 are similar to the processing operations in steps having the respective same step numbers in the flowchart of FIG. 9B.

In step S1401, the CPU 261 performs handwritten region selection processing on the handwritten region generated in step S954 and updates the number of regions each generated as a handwritten region. The handwritten region selection processing is described with reference to FIG. 14B. FIG. 14B is a flowchart illustrating the flow of handwritten region selection processing in the second exemplary embodiment.

In step S1451, the CPU 261 selects one of the handwritten regions estimated in step S954.

In step S1452, the CPU 261 determines whether the area of the handwritten region selected in step S1451 corresponds to a small region. The CPU 261 counts the number of pixels corresponding to the handwritten region, and, if the counted number is less than or equal to a predetermined threshold value, the CPU 261 sets the determination result to "yes" (YES in step S1452), and then advances the processing to step S1453. If not so, the CPU 261 sets the determination result to "no" (NO in step S1452), and then returns the processing to step S1451.

In step S1453, the CPU 261 records a value indicating that the region is not a handwritten region on a group of pixels in the handwritten region generated in step S954 corresponding to the handwritten region the determination result of which is "no" in step S1452. This enables eliminating a small region unnecessary for handwritten extraction the area of which is less than or equal to the predetermined threshold value.

In step S1454, the CPU 261 determines whether all of the handwritten regions have been processed. If processing in step S1452 has been performed on all of the handwritten regions estimated in step S954, the CPU 261 sets the determination result to "yes" (YES in step S1454), and then ends the handwritten region selection processing. If not so, the CPU 261 sets the determination result to "no" (NO in step S1454), and then returns the processing to step S1451, in which the CPU 261 selects and processes a next handwritten region.

As described above, according to the second exemplary embodiment, with respect to the estimated handwritten regions, the image processing system 100 is able to eliminate a small region unnecessary for handwritten extraction. This enables eliminating a region unnecessary for handwritten extraction and thus more reducing the amount of calculation required for the neural network 1100 to perform handwritten extraction. Moreover, eliminating an erroneously extracted region for handwritten region estimation enables increasing a handwritten OCR recognition rate.

In a third exemplary embodiment, in addition to the method for business form conversion-to-text processing described in the first and second exemplary embodiments, a method of determining whether a handwritten entry is present in a processing target image is described. In the first and second exemplary embodiments, a feature map obtained by narrowing down to only a handwritten region of the processing target image is input to a decoder unit for handwritten extraction, so that the amount of calculation in the entire neural network is reduced. However, in a case where there is no handwritten entry in a processing target image, a useless calculation may be spent on handwritten region estimation. For example, not only an application form concerning service use may be distributed at the window of a service provider, but also, in recent years, a format thereof may be released to the public via the Internet. The applicant can previously download a format, print the format, and write in the format and then go to the window, so that a time for procedure at the window can be shortened. Since the format is an electronic file, the user can also electronically input an entry content to the format and print the format with the entry content written therein. Thus, in this case, the application form is composed of only type-font characters. The service provider processes and converts, into text data, a business form composed of handwritten characters and type-font characters or a business form composed of only type-font characters.

In the third exemplary embodiment, a method of, in such a case, before performing handwritten region estimation and handwritten extraction, determining whether there is a handwritten entry in a processing target image and, if there is a handwritten entry, performing handwritten region estimation and handwritten extraction is described. Furthermore, in the following description, determining whether there is a handwritten entry in a processing target image is referred to as a "handwriting presence or absence determination". Moreover, it being determined by the handwriting presence or absence determination that there is a handwritten entry is referred to as "handwriting presence". Moreover, it being determined by the handwriting presence or absence determination that there is no handwritten entry is referred to as "handwriting absence". Furthermore, the configuration of an image processing system 100 according to the third exemplary embodiment is similar to the configurations in the first and second exemplary embodiments except for characterizing portions. Therefore, similar constituent elements are assigned the respective same reference characters and the detailed description thereof is omitted here.

<Configuration of Neural Network>

Figure 15:
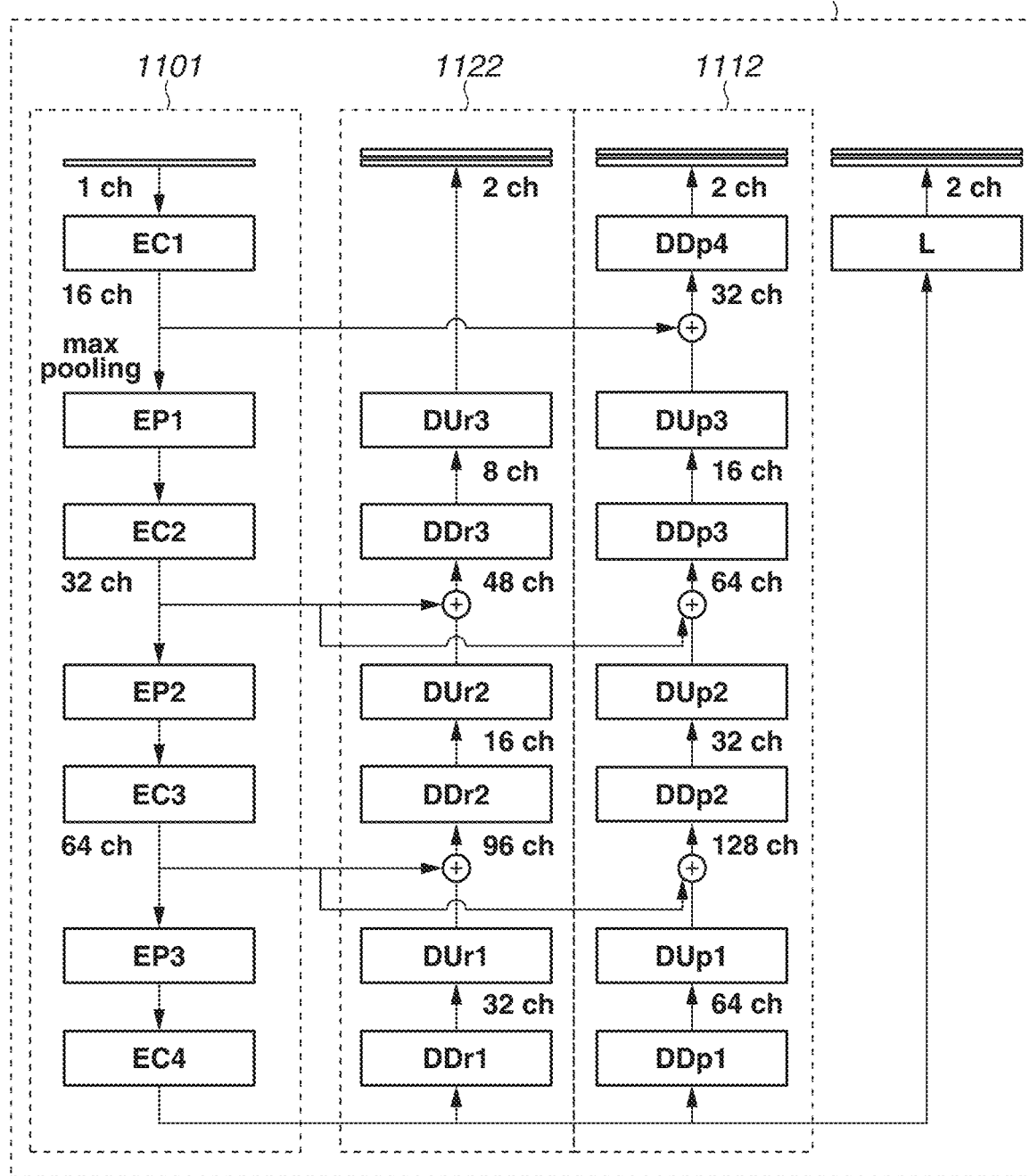
FIG. 15 is a diagram illustrating a configuration of a neural network in a third exemplary embodiment.

A configuration of a neural network in the third exemplary embodiment is described. FIG. 15 is a diagram illustrating a configuration of the neural network for the image processing system 100 in the third exemplary embodiment. The neural network 1500 in the third exemplary embodiment performs a plurality of types of processing operations on an input image. For example, the neural network 1500 performs handwriting presence or absence determination, handwritten region estimation, and handwritten extraction on an input image. Therefore, the neural network 1500 in the third exemplary embodiment has a configuration composed of a combination of a plurality of neural networks which processes respective different tasks. For example, the neural network 1500 illustrated in FIG. 15 has a configuration composed of a combination of a handwriting presence or absence determination neural network, a handwritten region estimation neural network, and a handwritten extraction neural network. Furthermore, in the third exemplary embodiment, an input image to the neural network 1500 is assumed to be a grayscale (one-channel) image, but can be another type of image, such as a color (three-channel) image.

As illustrated in FIG. 15, the neural network 1500 includes an encoder unit 1101, a pixel extraction decoder unit 1112, a region estimation decoder unit 1122, and a fully connected layer L.

The neural network 1500 includes, as in a conventional configuration, a handwritten extraction neural network composed of the encoder unit 1101 and the pixel extraction decoder unit 1112. Moreover, the neural network 1500 also includes a handwritten region estimation neural network composed of the encoder unit 1101 and the region estimation decoder unit 1122. Moreover, the neural network 1500 also includes a handwriting presence or absence determination neural network composed of the encoder unit 1101 and the fully connected layer L. In the third exemplary embodiment, such three neural networks share the encoder unit 1101, which is a layer that performs similar calculations in the respective neural networks. Then, switching is performed between the pixel extraction decoder unit 1112, the region estimation decoder unit 1122, and the fully connected layer L depending on tasks. Upon receiving an input image, the neural network 1500 performs calculation in the encoder unit 1101. Then, the neural network 1500 inputs a result of the calculation to the fully connected layer L, the region estimation decoder unit 1122, and the pixel extraction decoder unit 1112, and then outputs a handwriting presence or absence determination result via a calculation in the fully connected layer L. Moreover, the neural network 1500 outputs a handwritten region estimation result via a calculation in the region estimation decoder unit 1122. Moreover, the neural network 1500 outputs a handwritten extraction result via a calculation in the pixel extraction decoder unit 1112. Furthermore, in the third exemplary embodiment, in a case where the fully connected layer L has output "handwriting absence", the neural network 1500 does not perform calculations in the region estimation decoder unit 1122 and the pixel extraction decoder unit 1112. Details thereof are described below.

An input to the fully connected layer L is generated by converting a feature map obtained via the pooling layer EP3, which is a final output of the encoder unit 1101. Such a conversion can be performed by using, for example, the following method. While a feature map output from the pooling layer EP3 is composed of a plurality of channels, the method calculates an average value of all of the pixel values in each channel. Then, the method integrates and converts the average values calculated for the number of channels into a vector and sets the vector as an input to the fully connected layer L. Furthermore, another conversion method of, for example, converting each channel from a 2×2 dimensional matrix to a 1×2 dimensional vector and setting a vector connected to the vectors calculated for the number of channels as an input to the fully connected layer L can be employed. Then, the fully connected layer L converts the input and causes the converted input to undergo an activating function, thus outputting a feature variable, which is a value obtained by converting a feature into a numerical value. The neural network 1500 performs a conversion for normalizing a feature variable, which is an output from the fully connected layer L, into a probability distribution, thus converting the feature variable into a probability of handwriting presence and a probability of handwriting absence, and performs handwriting presence or absence determination according to the probabilities. Here, as a method of normalization into a probability distribution, for example, a softmax function is used. Furthermore, while, in the third exemplary embodiment, an output of the pooling layer EP3 is set as an input to the fully connected layer L, each of outputs of the pooling layers EP1 and EP2 can be set as an input to the fully connected layer L.

<Learning Data Generation Processing>

Figure 16A:
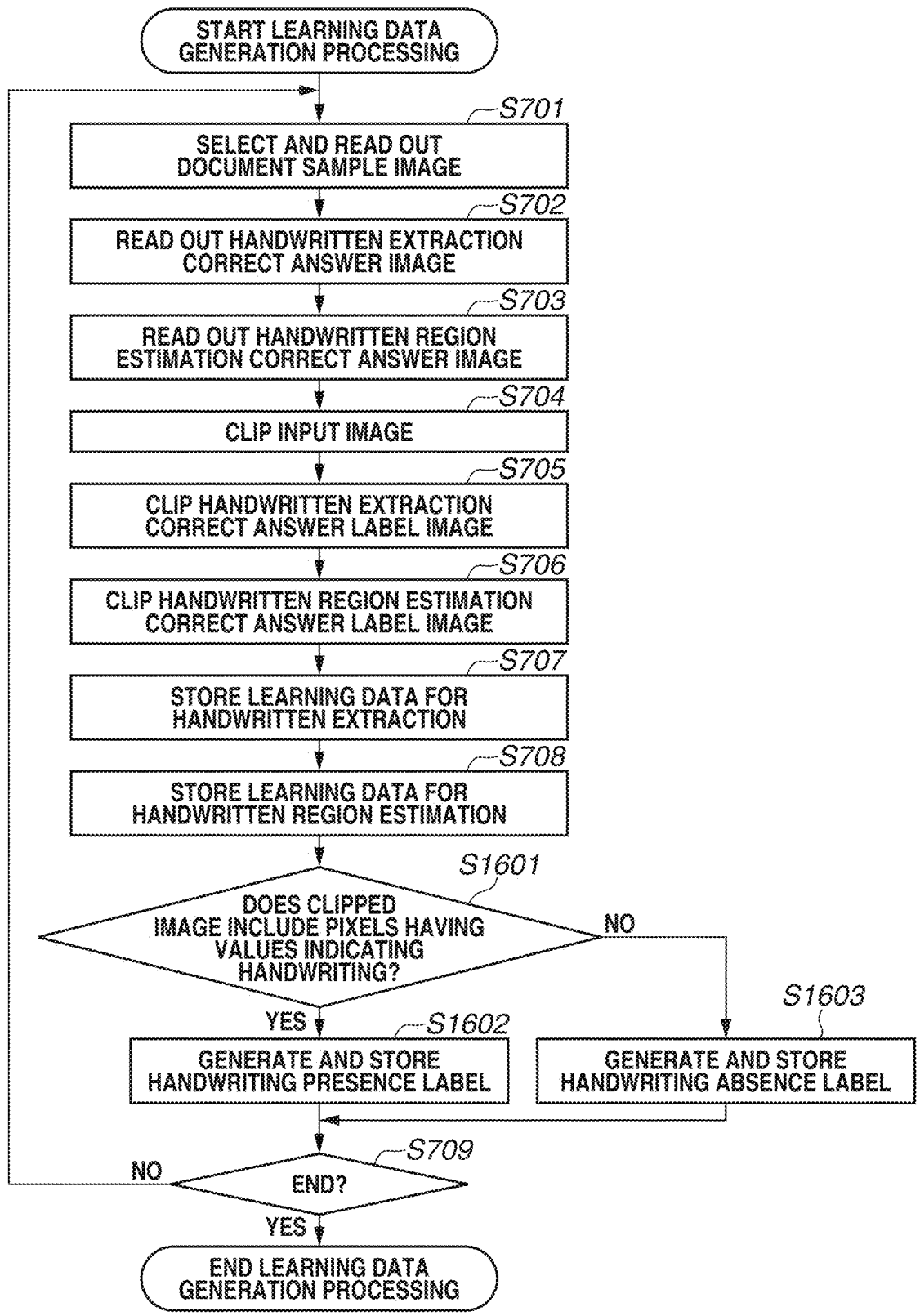
FIG. 16A is a flowchart illustrating the flow of learning data generation processing in the third exemplary embodiment.

Next, learning data generation processing which is performed by the learning apparatus 102 is described. FIG. 16A is a flowchart illustrating the flow of learning data generation processing. This processing is implemented by the learning data generation unit 112 of the learning apparatus 102. This processing is started by the user performing a predetermined operation via the input device 236 of the learning apparatus 102.

Processing operations in steps S701 to S708 are similar to the processing operations in steps having the respective same step numbers in the flowchart of FIG. 7A.

In step S1601, the CPU 231 determines whether the handwritten extraction correct answer label image generated in step S705 includes a pixel having a value indicating a handwritten portion. The CPU 231 scans the handwritten extraction correct answer label image generated in step S705 and determines whether there is a value indicating a handwritten portion therein. If there is a value indicating a handwritten portion, the CPU 231 sets the determination result to "yes" (YES in step S1601), and then advances the processing to step S1602. If not so, the CPU 231 sets the determination result to "no" (NO in step S1601), and then advances the processing to step S1603. Furthermore, here, a configuration in which a threshold value is previously set with respect to the number of pixels having a value indicating a handwritten portion and, if there are pixels having a value indicating a handwritten portion the number of which exceeds the threshold value, the CPU 231 sets the determination result to "yes" can be employed.

In step S1602, with respect to the input image generated in step S704 corresponding to the handwritten extraction correct answer label image determined as "yes" in step S1601, the CPU 231 generates a value indicating handwriting presence as a correct answer label for use in learning data for handwriting presence or absence determination. Furthermore, in the following description, this correct answer label is referred to as a "handwriting presence or absence determination correct answer label". Then, the CPU 231 associates the input image and the handwriting presence or absence determination correct answer label with each other and stores the associated image and label as learning data for handwriting presence or absence determination in a predetermined region of the storage 235.

In step S1603, with respect to the input image generated in step S704 corresponding to the handwritten extraction correct answer label image determined as "no" in step S1601, the CPU 231 generates a value indicating handwriting absence as the handwriting presence or absence determination correct answer label. Then, the CPU 231 associates the input image and the handwriting presence or absence determination correct answer label with each other and stores the associated image and label as learning data for handwriting presence or absence determination in a predetermined region of the storage 235.

<Learning Processing>

Next, learning processing which is performed by the learning apparatus 102 is described. FIG. 16B is a flowchart illustrating the flow of learning processing. This processing is implemented by the learning unit 113 of the learning apparatus 102. This processing is started by the user performing a predetermined operation via the input device 236 of the learning apparatus 102. Furthermore, in the third exemplary embodiment, a mini-batch method is assumed to be used for learning of the neural network 1500.

Processing operations in steps S731 to S733 are similar to the processing operations in steps having the respective same step numbers in the flowchart of FIG. 7B.

In step S1631, the CPU 231 calculates an error in a handwriting presence or absence determination result of the neural network 1500. Thus, the CPU 231 inputs the feature maps acquired in step S733 to the fully connected layer L, and obtains an output of the fully connected layer L. The output is a probability distribution normalized with respect to a probability of handwriting presence of the input image and a probability of handwriting absence of the input image. Then, the CPU 231 evaluates a difference between the output and a handwriting presence or absence determination correct answer label included in the learning data, thus obtaining an error. Cross-entropy can be used as a barometer of the evaluation as with handwritten extraction.

Processing operations in steps S734 to S735 are similar to the processing operations in steps having the respective same step numbers in the flowchart of FIG. 7B.

In step S1632, the CPU 231 adjusts parameters of the neural network 1500. Thus, the CPU 231 changes the values of parameters of the neural network 1500 by a back propagation method based on the errors calculated in steps S1631, S734, and S735.

<Business Form Conversion-to-Text Processing>

Figure 17:
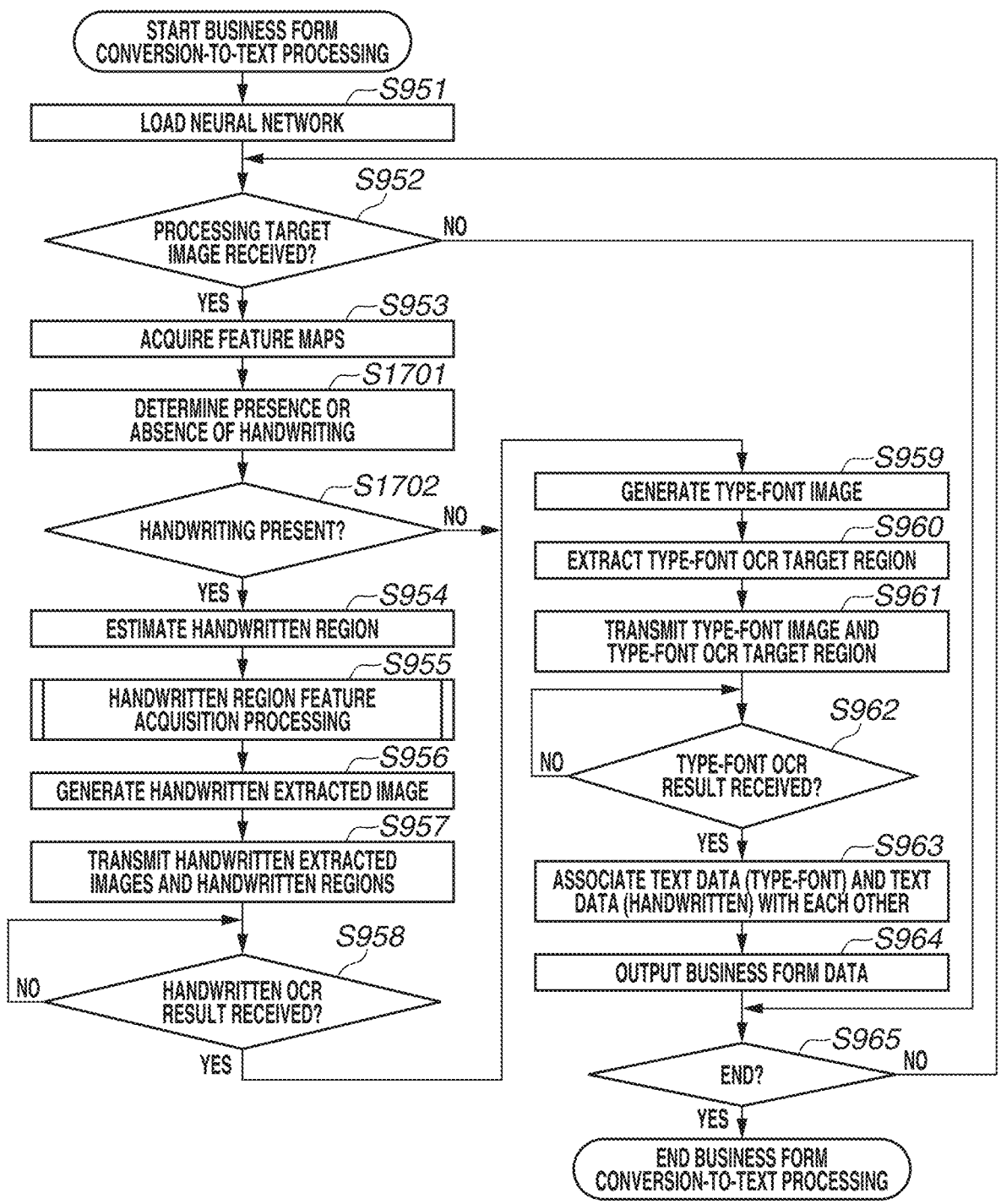
FIG. 17 is a flowchart illustrating the flow of business form conversion-to-text processing in the third exemplary embodiment.

Next, business form conversion-to-text processing which is performed by the image processing server 103 is described. FIG. 17 is a flowchart illustrating the flow of business form conversion-to-text processing. The business form conversion-to-text processing is implemented by the CPU 261 reading out an image processing server program stored in the storage 265, loading the image processing server program onto the RAM 264, and executing the image processing server program. This processing is started by the user powering on the image processing server 103.

Processing operations in steps S951 to S953 are similar to the processing operations in steps having the respective same step numbers in the flowchart of FIG. 9B.

In step S1701, the CPU 261 performs handwriting presence or absence determination with respect to a processing target image received from the image processing apparatus 101. The CPU 261 inputs the feature maps acquired in step S953 to the fully connected layer L, thus causing the neural network 1500 to determine the presence or absence of handwriting. As the output of the neural network 1500, in a case where handwriting presence has been acquired as a determination result, a value indicating handwriting presence is output, and, in a case where handwriting absence has been acquired as a determination result, a value indicating handwriting absence is output.

In step S1702, the CPU 261 determines whether handwriting is present in the processing target image. If a value indicating handwriting presence has been obtained in the handwriting presence or absence determination performed in step S1701, the CPU 261 sets the determination result to "yes" (YES in step S1702), and then advances the processing to step S954. If not so, the CPU 261 sets the determination result to "no" (NO in step S1702), and then advances the processing to step S959.

Processing operations in steps S954 to S958 are similar to the processing operations in steps having the respective same step numbers in the flowchart of FIG. 9B.

In step S959, the CPU 261 generates a type-font image. In a case where the determination result in step S1702 is "yes", the CPU 261 generates a type-font image by removing handwritten portions from the processing target image in the processing operations in steps having the respective same step numbers in the flowchart of FIG. 9B. In a case where the determination result in step S1702 is "no", the CPU 261 directly sets the processing target image as a type-font image.

Processing operations in steps S960 to S965 are similar to the processing operations in steps having the respective same step numbers in the flowchart of FIG. 9B.

As described above, according to the third exemplary embodiment, before performing handwritten region estimation and handwritten extraction, the image processing system 100 determines whether there is a handwritten entry in a processing target image and, if there is a handwritten entry, performs handwritten region estimation and handwritten extraction. This enables reducing the amount of calculation required in a case where there is no handwritten entry in a processing target image.

In a fourth exemplary embodiment, a case where the neural network and configuration in the present disclosure is applied to a task different from those in the first, second, and third exemplary embodiments is described. Furthermore, the configuration in the present disclosure is a configuration for inputting a feature map obtained by narrowing down to only a region including an object targeted for recognition estimated by a region estimation decoder unit to a decoder unit which extracts pixels of the object targeted for recognition. In the fourth exemplary embodiment, a case where a seal image (the image of an impressed seal) included in a document is targeted as an object targeted for recognition is described. Thus, an example of a configuration in which a neural network is used for processing for extracting pixels constituting a seal image and processing for estimating a region including a seal image is described. For example, with regard to an account transfer request form, a seal included in a business form may be verified with respect to a seal registered in, for example, a database. According to the fourth exemplary embodiment, the image processing system 100 is able to extract a region including a seal and pixels thereof, thus automating extraction of a seal targeted for verification. Moreover, the image processing system 100 is able to separate a printed portion serving as a background for a seal (a printed portion for guiding a seal impressing position, such as "L.S.") and the seal from each other, thus enabling performing verification with a higher degree of accuracy.

Furthermore, in the following description, estimating a region including a seal is referred to as "seal region estimation", and extracting a seal for each pixel is referred to as "seal extraction". Moreover, the image processing system 100 in the fourth exemplary embodiment is a system in which an extraction target and a region estimation target in the first, second, and third exemplary embodiments are changed from handwritten characters to a seal. Therefore, the configuration and processing operations of the image processing system 100 in the fourth exemplary embodiment are similar to the configuration and processing operations in the first, second, and third exemplary embodiments, and "handwritten portion", "handwritten characters", and "entry of handwritten characters" described in the first, second, and third exemplary embodiments are replaced with "seal". In the following description, the details of learning data for use in learning processing for a neural network, which is a difference between the fourth exemplary embodiment and the first, second, and third exemplary embodiments, are described. Moreover, the details of seal verification request processing and seal verification processing are described. Furthermore, similar constituent elements between the fourth exemplary embodiment and the first, second, and third exemplary embodiments are assigned the respective same reference characters, and the detailed description thereof are omitted here.

<Operation Screens>

As with the first exemplary embodiment, the user performs an operation based on a seal extraction correct answer data creation screen and a seal region estimation correct answer data creation screen and thus creates correct answer data. Furthermore, the seal extraction correct answer data creation screen and the seal region estimation correct answer data creation screen are screens in which, in the screens illustrated in FIGS. 5A to 5D, a target to be designated by the user is changed to a seal, and operations to be performed thereon by the user are similar to those described above. Moreover, a document sample image in the fourth exemplary embodiment is, for example, a business form 1800 illustrated in FIG. 18A or a business form 1850 illustrated in FIG. 18B.

Figures 18A, 18B, 18C, 18D:
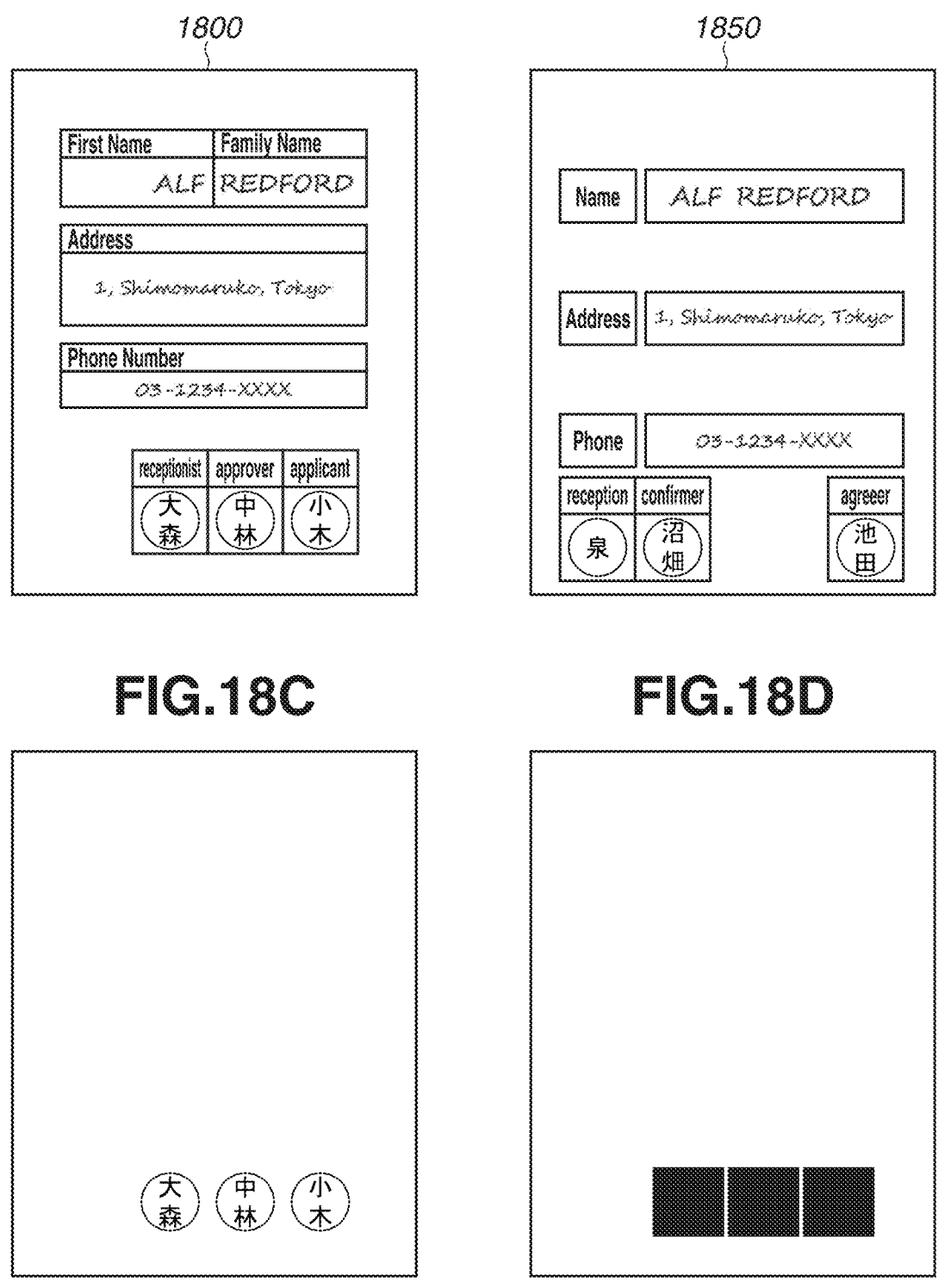

Correct answer data for seal extraction is accumulated as the following image in the image accumulation unit 115. The image has the same size (width and height) as a document sample image. The value of each pixel of a seal position selected by the user is a value indicating a seal (for example, "255", and the same also applying to the following description). The value of each of the other pixels is a value indicating not a seal (for example, "0", and the same also applying to the following description). Hereinafter, such an image serving as correct answer data for seal extraction is referred to as a "seal extraction correct answer image". FIG. 18C illustrates an example of the seal extraction correct answer image.

Moreover, correct answer data for seal region estimation is accumulated as the following image in the image accumulation unit 115. The image has the same size (width and height) as a document sample image. The value of each pixel corresponding to a seal region selected by the user is a value indicating a seal region (for example, "255", and the same also applying to the following description). The value of each of the other pixels is a value indicating not a seal region (for example, "0", and the same also applying to the following description). Hereinafter, such an image serving as correct answer data for seal region estimation is referred to as a "seal region estimation correct answer image". FIG. 18D illustrates an example of the seal region estimation correct answer image.

<Learning Data Generation Processing>

Learning data generation processing similar to that in the first exemplary embodiment is implemented by the learning data generation unit 112 of the learning apparatus 102. This processing is started by the user performing a predetermined operation via the input device 236 of the learning apparatus 102.

Figure 19A:
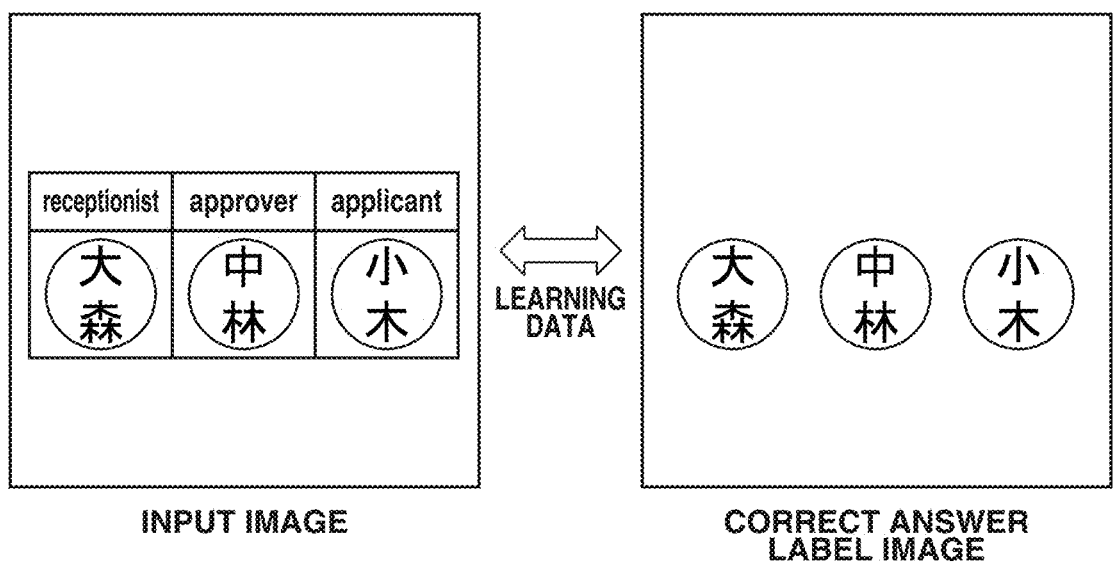
FIG. 19A is a diagram illustrating a configuration example of learning data for seal extraction.

As with the first exemplary embodiment, the CPU 231 generates a correct answer label image for use in learning data for seal extraction (hereinafter, this correct answer label image being referred to as a "seal extraction correct answer label image"), and stores the seal extraction correct answer label image as learning data for seal extraction in a predetermined region of the storage 235. In the fourth exemplary embodiment, learning data such as that illustrated in FIG. 19A is stored.

Figure 19B:
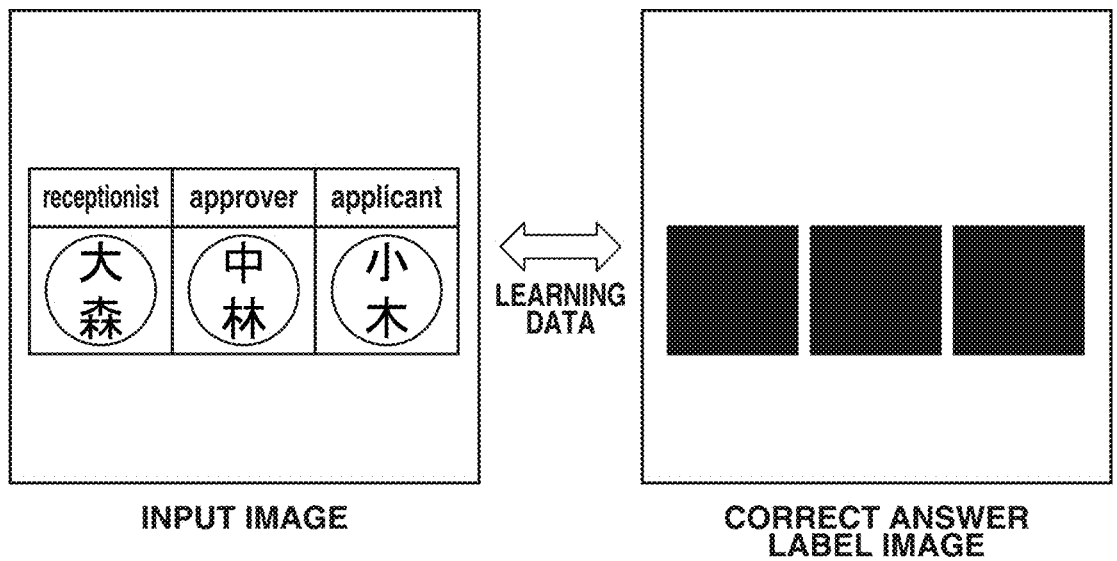
FIG. 19B is a diagram illustrating a configuration example of learning data for seal region estimation.

Moreover, as with the first exemplary embodiment, the CPU 231 generates a correct answer label image for use in learning data for seal region estimation (hereinafter, this correct answer label image being referred to as a "seal region estimation correct answer label image"), and stores the seal region estimation correct answer label image as learning data for seal region estimation in a predetermined region of the storage 235. In the fourth exemplary embodiment, learning data such as that illustrated in FIG. 19B is stored.

<Seal Verification Request Processing>

Figure 20A:
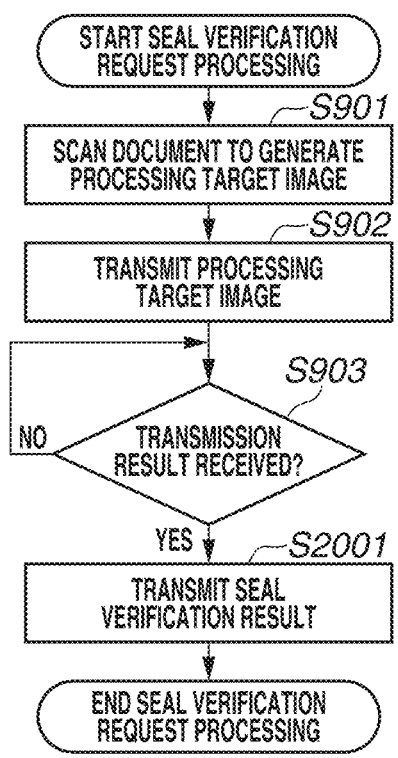
FIG. 20A is flowchart illustrating the flow of seal verification request processing.

Next, seal verification request processing which is performed by the image processing apparatus 101 is described. The image processing apparatus 101 scans a business form with a seal impressed thereon to generate a processing target image. Then, the image processing apparatus 101 transmits the processing target image to the image processing server 103 and requests the image processing server 103 to perform seal verification. FIG. 20A is a flowchart illustrating the flow of seal verification request processing. This processing is implemented by the CPU 201 of the image processing apparatus 101 reading out a controller program stored in the storage 208, loading the controller program onto the RAM 204, and executing the controller program. This processing is started by the user performing a predetermined operation via the input device 209 of the image processing apparatus 101.

Processing operations in steps S901 to S903 are similar to the processing operations in steps having the respective same step numbers in the flowchart of FIG. 9A.

In step S2001, the CPU 201 outputs a processing result received from the image processing server 103, i.e., a result of verifying a seal included in the processing target image generated in step S901. For example, the CPU 201 transmits, via the external interface 211, the verification result to a transmission destination set by the user operating the input device 209.

<Seal Verification Processing>

Figure 20B:
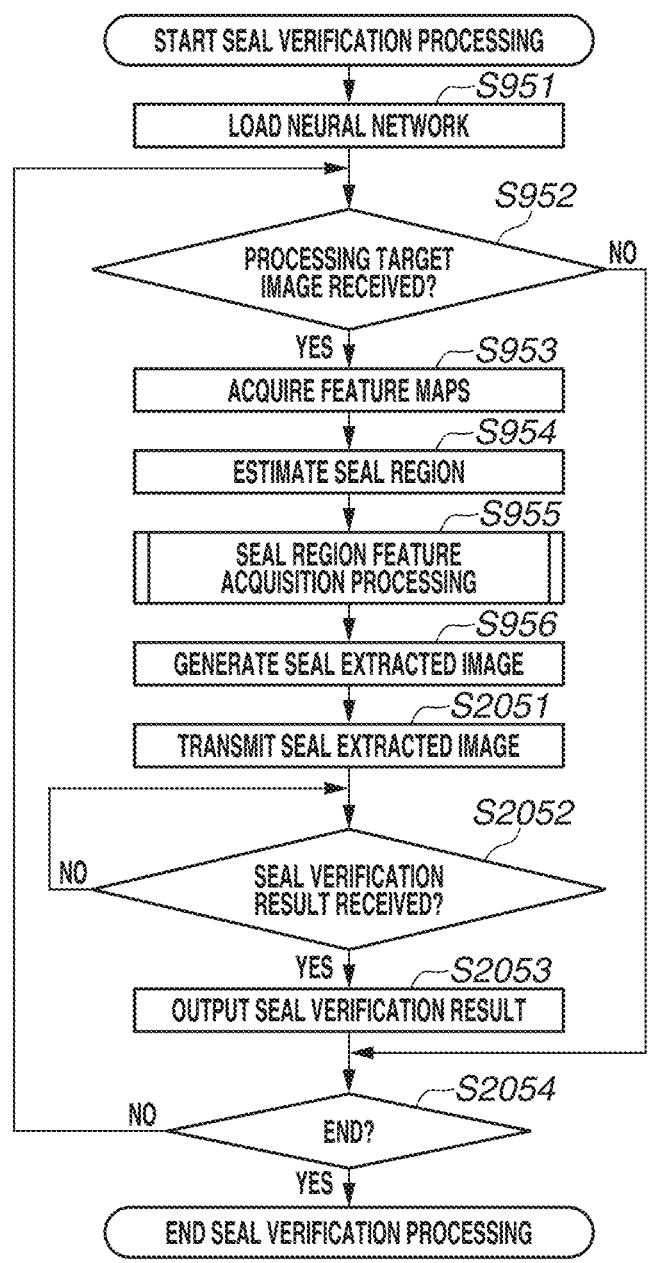
FIG. 20B is a flowchart illustrating the flow of seal verification processing.

Next, seal verification processing which is performed by the image processing server 103 is described. FIG. 20B is a flowchart illustrating the flow of seal verification processing. Furthermore, the image processing system 100 in the fourth exemplary embodiment includes a seal verification server (not illustrated) instead of the OCR server 104 described in the first exemplary embodiment. The seal verification server includes a seal database which registers and accumulates a seal image and registrant information about the seal (for example, the name, address, and account number) while associating them with each other. Moreover, the seal verification server includes a seal verification unit which verifies the transmitted seal image with respect to a seal image previously registered in the seal database and outputs a result indicating whether the seal image is currently registered. The image processing server 103, which functions as the image conversion unit 114, receives a processing target image from the image processing apparatus 101, and verifies a seal included in the scanned image data with the seal database included in the seal verification server, thus obtaining a verification result. The seal verification server causes the seal verification unit to verify the seal with the seal database. The seal verification processing is implemented by the CPU 261 reading out an image processing server program stored in the storage 265, loading the image processing server program onto the RAM 264, and executing the image processing server program. This processing is started by the user powering on the image processing server 103.

Processing operations in steps S951 to S956 are similar to processing operations in which, in steps having the respective same step numbers in the flowchart of FIG. 9B, "handwritten" is replaced with "seal".

In step S2051, the CPU 261 transmits the seal extracted image generated in step S956 to the seal verification unit via the external interface 268. Then, the CPU 261 causes the seal verification unit to perform seal verification. The seal verification can be implemented by applying a known technique thereto. Performing seal verification on the seal extracted image enables preventing or reducing a printed portion for guiding a seal impressing position, such as "L.S." in a seal background, from becoming targeted for seal verification.

In step S2052, the CPU 261 determines whether a seal verification result has been received from the seal verification unit. The seal verification result is a value indicating whether the seal extracted image is currently registered in the seal database. For example, in a case where the seal extracted image is currently registered, the seal verification result represents "1" as an output, and, in a case where the seal extracted image is not currently registered, the seal verification result represents "0" as an output. If the seal verification result has been received from the seal verification unit via the external interface 268, the CPU 261 sets the determination result to "yes" (YES in step S2052), and then advances the processing to step S2053. If not so, the CPU 261 sets the determination result to "no" (NO in step S2052), and then repeats the processing in step S2052.

In step S2053, the CPU 261 transmits the seal verification result received in step S2052 to the image acquisition unit 111.

In step S2054, the CPU 261 determines whether to end the processing. In a case where the user has performed a predetermined operation, such as powering off the image processing server 103, the CPU 261 sets the determination result to "yes" (YES in step S2054), and then ends the processing. If not so, the CPU 261 sets the determination result to "no" (NO in step S2054), and then returns the processing to step S952.

As described above, according to the fourth exemplary embodiment, the neural network and configuration of the present disclosure are not limited to handwritten region estimation and handwritten extraction, but can also be applied to seal region estimation and seal extraction. Here, the configuration of the present disclosure is a configuration for inputting a feature map obtained by narrowing down to only a region targeted for recognition estimated by a recognition-target region estimation decoder unit to a decoder unit which extracts pixels targeted for recognition. As another example of application, when a business form composed of only type-font characters is supposed, the neural network and configuration of the present disclosure can also be applied to estimation of a type-font region, which is an item including only type-font characters, and type-font pixel extraction for extracting type-font pixels included in the type-font region.

The present disclosure can also be implemented by processing for supplying a program for implementing one or more functions of the above-described exemplary embodiments to a system or apparatus via a network or a storage medium and causing one or more processors included in the system or apparatus to read out and execute the program. Moreover, the present disclosure can also be implemented by a circuit which implements such one or more functions (for example, an application specific integrated circuit (ASIC)).

The present disclosure can also be applied to both a system composed of a plurality of apparatuses and a system composed of one apparatus. For example, in the above-described exemplary embodiments, the learning data generation unit 112 and the learning unit 113 are configured to be implemented in the learning apparatus 102, but can be configured to be implemented in the respective separate apparatuses. In this case, an apparatus for implementing the learning data generation unit 112 transmits learning data generated by the learning data generation unit 112 to an apparatus for implementing the learning unit 113. Then, the learning unit 113 performs learning of a neural network based on the received learning data. While the image processing apparatus 101 and the image processing server 103 have been described to be the respective separate apparatuses, the image processing apparatus 101 can be configured to include the functions of the image processing server 103. While the image processing server 103 and the OCR server 104 have been described to be the respective separate apparatuses, the image processing server 103 can be configured to include the functions of the OCR server 104.

The present disclosure is not limited to the above-described exemplary embodiments but can be modified in various manners (including an organic combination of some or all of the above-described exemplary embodiments) based on the gist of the present disclosure, and such modifications are not intended to be excluded from the scope of the present disclosure. Thus, all of the configurations obtained by combining some or all of the above-described exemplary embodiments and modifications thereof are included in the present disclosure.

While, in the above-described exemplary embodiments, a method in which extraction of a type-font region is determined based on connectedness of pixels as in step S959 has been described, a type-font region can be estimated with use of a neural network as with handwritten region estimation. For example, the user selects a type-font region in the same manner as in creating a handwritten region estimation correct answer image, creates correct answer data based on the type-font region, builds out a new neural network which performs type-font OCR region estimation, and causes the neural network to perform learning based on the correct answer data.

In the above-described exemplary embodiments, learning data is generated by the learning data generation processing at the time of learning processing. However, a configuration in which a large number of pieces of learning data are previously generated by the learning data generation processing and, at the time of learning processing, pieces of learning data corresponding to a mini-batch size are sampled as needed can be employed.

In the above-described exemplary embodiments, the input image is generated as a grayscale image, but can be generated as another type of image, such as a full-color image.

Figures 21A, 21B:
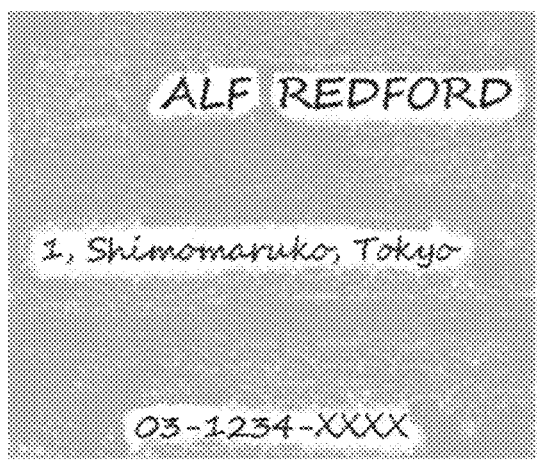
FIG. 21A is a diagram illustrating an example of a processing target image.
FIG. 21B is a diagram illustrating an example of an estimation result by neural networks for handwritten region estimation and handwritten extraction.
Figures 22A, 22B:
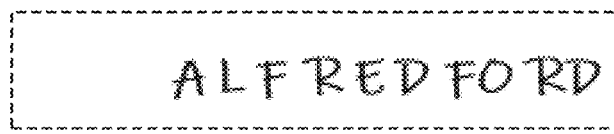
FIGS. 22A and 22B are diagrams illustrating an example of an entry on a business form.

Furthermore, finally, examples of estimation results obtained by the neural network for handwritten extraction and the neural network for handwritten region estimation performing learning according to the methods described in the present disclosure are illustrated. FIG. 21A illustrates an example of a processing target image. FIG. 21B illustrates an example of an estimation result obtained by the neural network for handwritten region estimation and the neural network for handwritten extraction. The estimation result illustrated in FIG. 21B is obtained based on the processing target image illustrated in FIG. 21A being input. In FIG. 21B, handwritten characters (character portions) extracted by the neural network for handwritten extraction and handwritten regions (white hatch portions) estimated by the neural network for handwritten region estimation are illustrated.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-085350 filed May 14, 2020, which is hereby incorporated by reference herein in its entirety.

What is claimed is:

1. An image processing apparatus comprising:
at least one memory that stores instructions that include a neural network; and at least one processor that executes the instructions to perform:

convolutional processing on a processing target image by an encoder included in the neural network to obtain a feature map;

first deconvolutional processing on the obtained feature map by a first decoder included in the neural network to obtain a region including an object targeted for recognition included in the processing target image;

obtaining, from the obtained feature map, a partial feature map of a portion corresponding to the obtained region; and second deconvolutional processing on the obtained partial feature map by a second decoder included in the neural network to obtain pixels corresponding to the object targeted for recognition included in the processing target image.

2. The image processing apparatus according to claim 1, wherein the obtained partial feature map is a partial feature map of a portion corresponding to a region excluding a region having a predetermined number or less of pixels from among the region including the object targeted for recognition obtained by the first deconvolutional processing.

3. The image processing apparatus according to claim 1, wherein the object targeted for recognition includes a handwritten character.

4. The image processing apparatus according to claim 1, wherein the object targeted for recognition includes an impressed seal.

5. A non-transitory computer-readable storage medium storing instructions including a neural network, wherein the instructions cause a computer to perform:

convolutional processing on a processing target image by an encoder included in the neural network to obtain a feature map;

first deconvolutional processing on the obtained feature map by a first decoder included in the neural network to obtain a region including an object targeted for recognition included in the processing target image;

obtaining, from the obtained feature map, a partial feature map of a portion corresponding to the obtained region; and second deconvolutional processing on the obtained partial feature map by a second decoder included in the neural network to obtain pixels corresponding to the object targeted for recognition included in the processing target image.

6. An image processing method comprising:

convolutional processing on a processing target image by an encoder included in a neural network to obtain a feature map;

first deconvolutional processing on the obtained feature map by a first decoder included in the neural network to obtain a region including an object targeted for recognition included in the processing target image;

obtaining, from the obtained feature map, a partial feature map of a portion corresponding to the obtained region; and second deconvolutional processing on the obtained partial feature map by a second decoder included in the neural network to obtain pixels corresponding to the object targeted for recognition included in the processing target image.

* * * * *